(12) United States Patent
Shirasuka

(10) Patent No.: US 9,883,228 B2
(45) Date of Patent: Jan. 30, 2018

(54) DIGITAL BROADCAST RECEPTION DEVICE AND CHANNEL SELECTION METHOD

(71) Applicant: MITSUBISHI ELECTRIC CORPORATION, Tokyo (JP)

(72) Inventor: Keiichi Shirasuka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 14/913,329

(22) PCT Filed: Sep. 11, 2014

(86) PCT No.: PCT/JP2014/074023
§ 371 (c)(1),
(2) Date: Feb. 19, 2016

(87) PCT Pub. No.: WO2015/056507
PCT Pub. Date: Apr. 23, 2015

(65) Prior Publication Data
US 2016/0212472 A1    Jul. 21, 2016

(30) Foreign Application Priority Data

Oct. 15, 2013  (JP) .................................. 2013-214379

(51) Int. Cl.
*H04N 21/426*    (2011.01)
*H04H 60/37*    (2008.01)
(Continued)

(52) U.S. Cl.
CPC ........ *H04N 21/4263* (2013.01); *H04H 20/22* (2013.01); *H04H 60/37* (2013.01);
(Continued)

(58) Field of Classification Search
CPC ......... H04N 21/4263; H04N 21/41422; H04N 21/41407; H04N 21/4524; H04N 5/50;
(Continued)

(56) References Cited

U.S. PATENT DOCUMENTS 7,061,542 B1 * 6/2006 Ikeguchi .................. H04N 5/46
348/558
8,345,166 B2   1/2013 Kawai et al.
(Continued)

FOREIGN PATENT DOCUMENTS

CN    101258700 A    9/2008
CN    102687524 A    9/2012
(Continued)

OTHER PUBLICATIONS

"Digital Video Broadcasting (DVB); Specification for Service Information (SI) in DVB systems", ETSI EN 300 468 V1.11.1 (Apr. 2010), pp. 1-137.
(Continued)

*Primary Examiner* — Nathan Flynn
*Assistant Examiner* — Cynthia Fogg
(74) *Attorney, Agent, or Firm* — Birch, Stewart, Kolasch & Birch, LLP

(57) ABSTRACT

A digital broadcast reception device includes a first broadcast reception system, a second broadcast reception system, an audio similarity-degree detection processor, a service list storage unit, and a reception monitoring unit that sends a notification signal to the first broadcast reception system when a value representing reception status of a channel currently selected by the first broadcast reception system becomes low. Upon receiving the notification signal, the first broadcast reception system refers to values representing audio similarity-degree in a service list stored in the service list storage unit, thereby judges a program which is most
(Continued)

similar to the program of the channel currently selected by the first broadcast reception system as an identical program, and switches the channel to a channel judged as the identical program.

17 Claims, 19 Drawing Sheets

(51) Int. Cl.
| | | |
|---|---|---|
| *H04H 60/43* | (2008.01) | |
| *H04H 60/58* | (2008.01) | |
| *H04N 21/2662* | (2011.01) | |
| *H04N 21/414* | (2011.01) | |
| *H04N 21/439* | (2011.01) | |
| *H04N 21/442* | (2011.01) | |
| *H04N 21/61* | (2011.01) | |
| *H04N 21/658* | (2011.01) | |
| *H04N 21/6587* | (2011.01) | |
| *H04H 20/22* | (2008.01) | |
| *H04N 21/2665* | (2011.01) | |
| *H04N 21/438* | (2011.01) | |
| *H04N 5/50* | (2006.01) | |

(52) U.S. Cl.
CPC ............ *H04H 60/43* (2013.01); *H04H 60/58* (2013.01); *H04N 21/2662* (2013.01); *H04N 21/2665* (2013.01); *H04N 21/41422* (2013.01); *H04N 21/4382* (2013.01); *H04N 21/4394* (2013.01); *H04N 21/44209* (2013.01); *H04N 21/6112* (2013.01); *H04N 21/6582* (2013.01); *H04N 21/6587* (2013.01); *H04N 5/50* (2013.01)

(58) Field of Classification Search
CPC ........... H04N 21/4383; H04N 21/4394; H04N 21/2662; H04N 21/4382; H04N 21/44209; H04N 21/2665; H04N 21/6112; H04N 21/6582; H04N 21/6587; H04W 72/085; H04W 24/02; H04W 88/06; H04W 52/245; H04W 88/04; H04H 20/22; H04H 60/37; H04H 60/43; H04H 60/58
USPC .............................. 725/59, 18; 348/726, 837
See application file for complete search history.

(56) References Cited

U.S. PATENT DOCUMENTS

| | | | | |
|---|---|---|---|---|
| 2002/0006203 A1* | 1/2002 | Tachibana | ............. | G10L 19/018 380/269 |
| 2002/0057380 A1* | 5/2002 | Matey | ................... | H04H 40/18 348/731 |
| 2006/0227255 A1* | 10/2006 | Yang | .................... | H04B 7/0814 348/837 |
| 2007/0040934 A1* | 2/2007 | Ramaswamy | ....... | H04N 21/235 348/385.1 |
| 2007/0052866 A1* | 3/2007 | Bae | ......................... | H04N 5/50 348/731 |
| 2009/0141838 A1* | 6/2009 | Han | ....................... | H04W 36/06 375/344 |
| 2012/0029913 A1* | 2/2012 | Takeuchi | ................ | G10L 15/01 704/226 |
| 2012/0192244 A1 | 7/2012 | Takaki et al. | | |
| 2013/0135534 A1* | 5/2013 | Murakami | ............. | H04H 20/26 348/726 |
| 2014/0327834 A1 | 11/2014 | Takaki et al. | | |

FOREIGN PATENT DOCUMENTS

| | | |
|---|---|---|
| EP | 1956720 A1 | 8/2008 |
| JP | 61-146040 U | 9/1986 |
| JP | 4-208720 A | 7/1992 |
| JP | 7-162770 A | 6/1995 |
| JP | 2001-128078 A | 5/2001 |
| JP | 2003-179950 A | 6/2003 |
| JP | 2006-295848 A | 10/2006 |
| JP | 2007-36815 A | 2/2007 |
| JP | 2007-189458 A | 7/2007 |
| JP | 2008-289018 a | 11/2008 |
| JP | 2009-268055 A | 11/2009 |
| JP | 2009-284212 A | 12/2009 |
| JP | 2010-114777 A | 5/2010 |
| JP | 2013-207688 A | 10/2013 |
| WO | WO 2013/099465 A1 | 7/2013 |

OTHER PUBLICATIONS

"Operational Guidelines for Digital Terrestrial Television Broadcasting", Technical Report, ARIB TR-B14, Edition 5.2 (vol. 2), Association of Radio Industries and Businesses (Published in Jul. 2013).

* cited by examiner

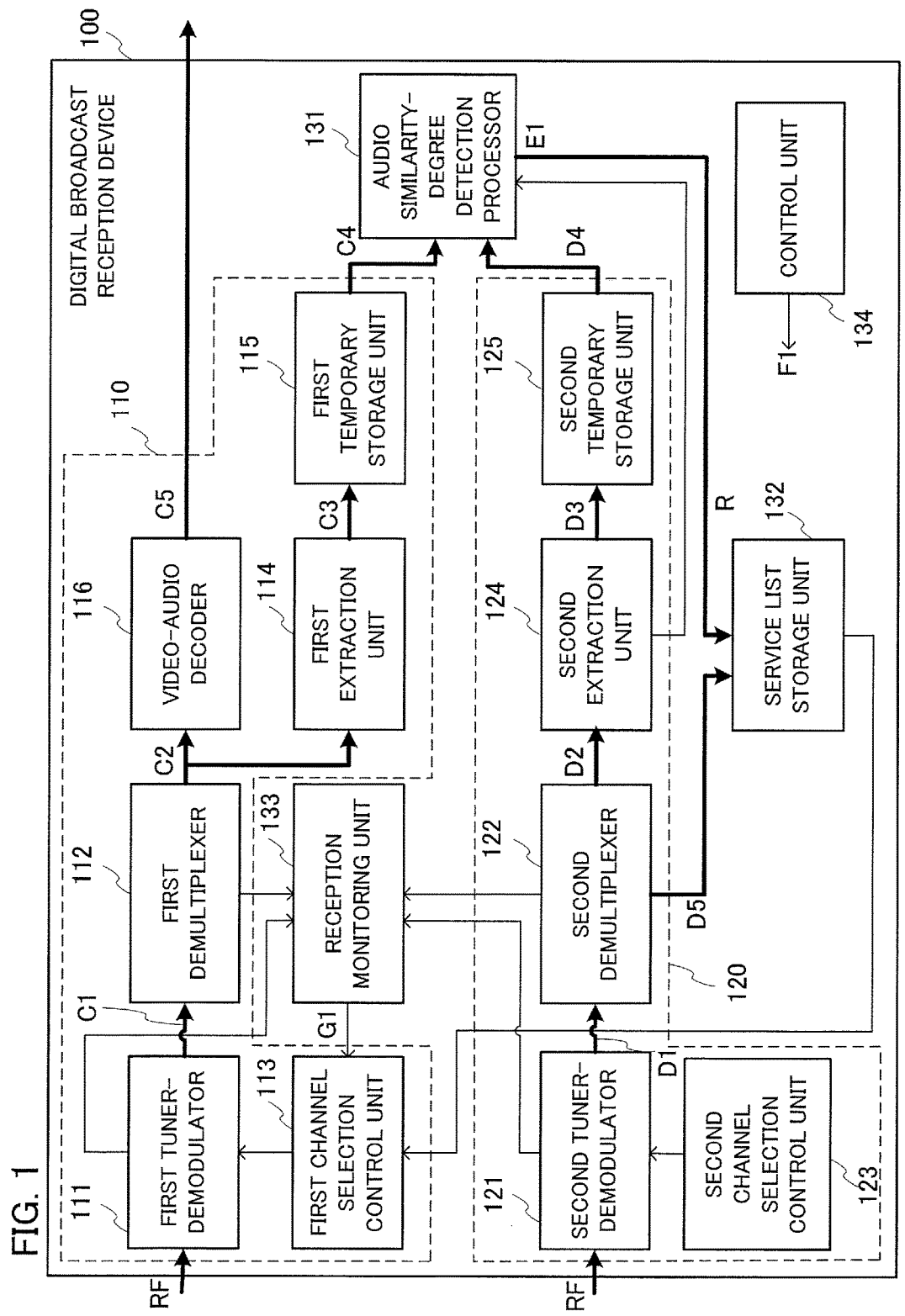

| PHYSICAL CHANNEL | SERVICE NAME | SERVICE ID | AUDIO SIMILARITY-DEGREE TOTAL VALUE R |
|---|---|---|---|
| 13ch | WWWW | 0xA800 | ---- (CURRENTLY VIEWED/LISTENED TO) |
| 14ch | AAAA | 0xEF32 | 21 |
| 15ch | BBBB | 0xC7B1 | 84 |
| 16ch | CCCC | 0xF327 | 15 |
| 17ch | DDDD | 0xDA30 | 17 |
| ... | ... | ... | ... |

| PHYSICAL CHANNEL | SERVICE NAME | SERVICE ID | AUDIO SIMILARITY-DEGREE TOTAL VALUE R | INFORMATION REPRESRNTING HISTORY OF BEING JUDGED AS IDENTICAL PROGRAM |
|---|---|---|---|---|
| 13ch | WWWW | 0xA800 | ---- (CURRENTLY VIEWED/LISTENED TO) | |
| 14ch | AAAA | 0xEF32 | 21 | PHYSICAL CHANNEL, SERVICE NAME, SERVICE ID |
| 15ch | BBBB | 0xC7B1 | 84 | PHYSICAL CHANNEL, SERVICE NAME, SERVICE ID |
| 16ch | CCCC | 0xF327 | 15 | PHYSICAL CHANNEL, SERVICE NAME, SERVICE ID |
| 17ch | DDDD | 0xDA30 | 17 | PHYSICAL CHANNEL, SERVICE NAME, SERVICE ID |
| ... | ... | ... | ... | ... |

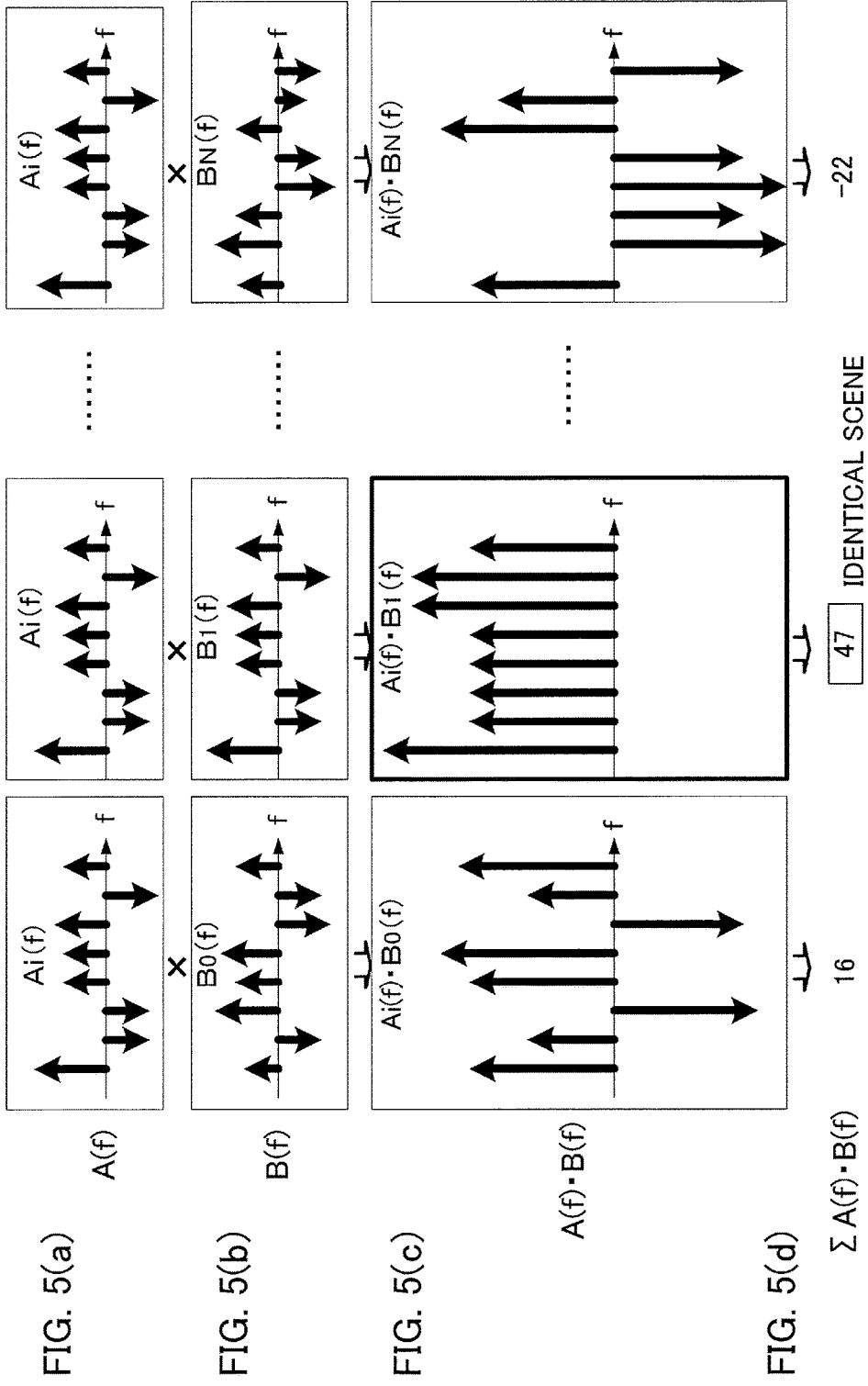

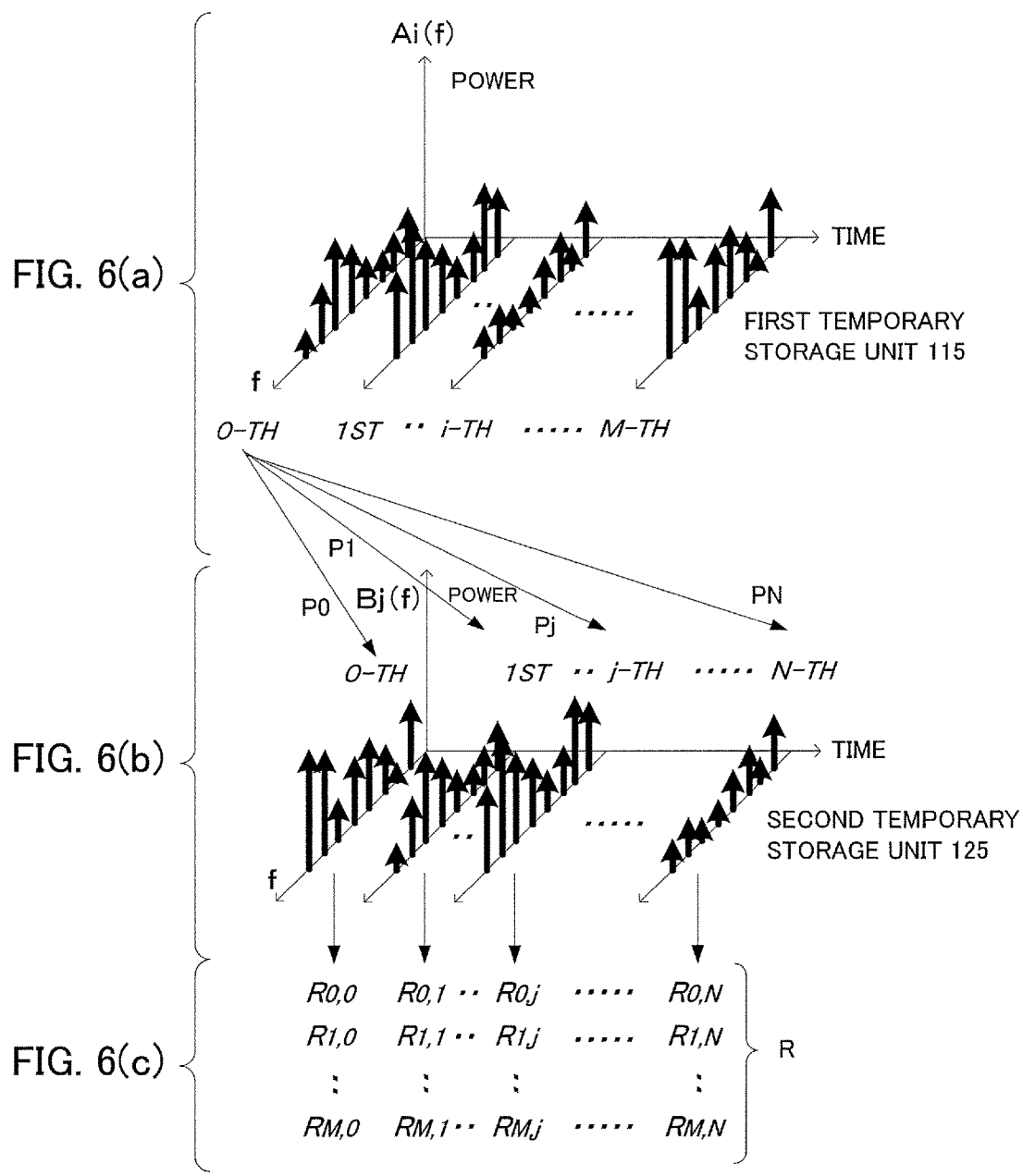

FIG. 9

| PHYSICAL CHANNEL | SERVICE NAME | SERVICE ID | H+1 AUDIO SIMILARITY-DEGREE TOTAL VALUES R[0], R[1], R[2], ..., R[H] | SUM TOTAL OF H+1 AUDIO SIMILARITY-DEGREE TOTAL VALUES $SUM = \sum_{k=0}^{H} R[k]$ |
|---|---|---|---|---|
| 13ch | WWWW | 0xA800 | (CURRENTLY VIEWED/LISTENED TO) | (CURRENTLY VIEWED/LISTENED TO) |
| 14ch | AAAA | 0xEF32 | 8, 3, 4, ·····, 1 | 32 |
| 15ch | BBBB | 0xC7B1 | 15, 21, 17, ·····, 19 | 102 |
| 16ch | CCCC | 0xF327 | 8, 2, 1, ·····, 5 | 18 |
| 17ch | DDDD | 0xDA30 | 4, 5, 4, ·····, 1 | 20 |
| ······ | ······ | ······ | ······ | ······ |

142

FIG. 14(d) $\sum_f |A(f) - B(f)|$  17  14  ◯ IDENTICAL SCENE

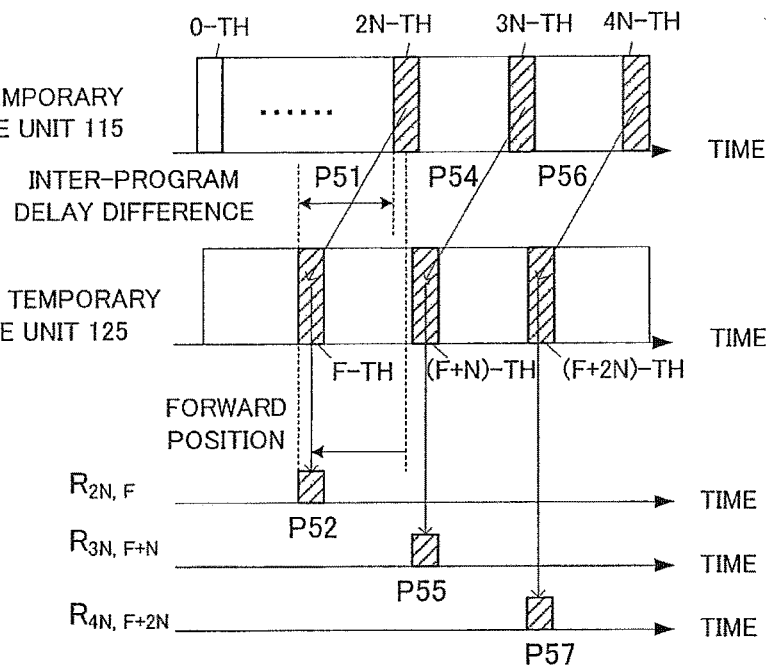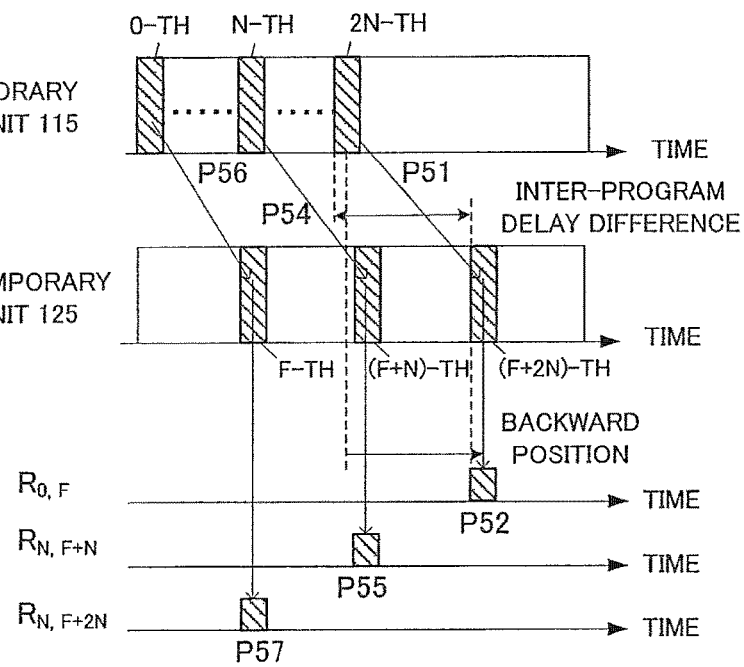

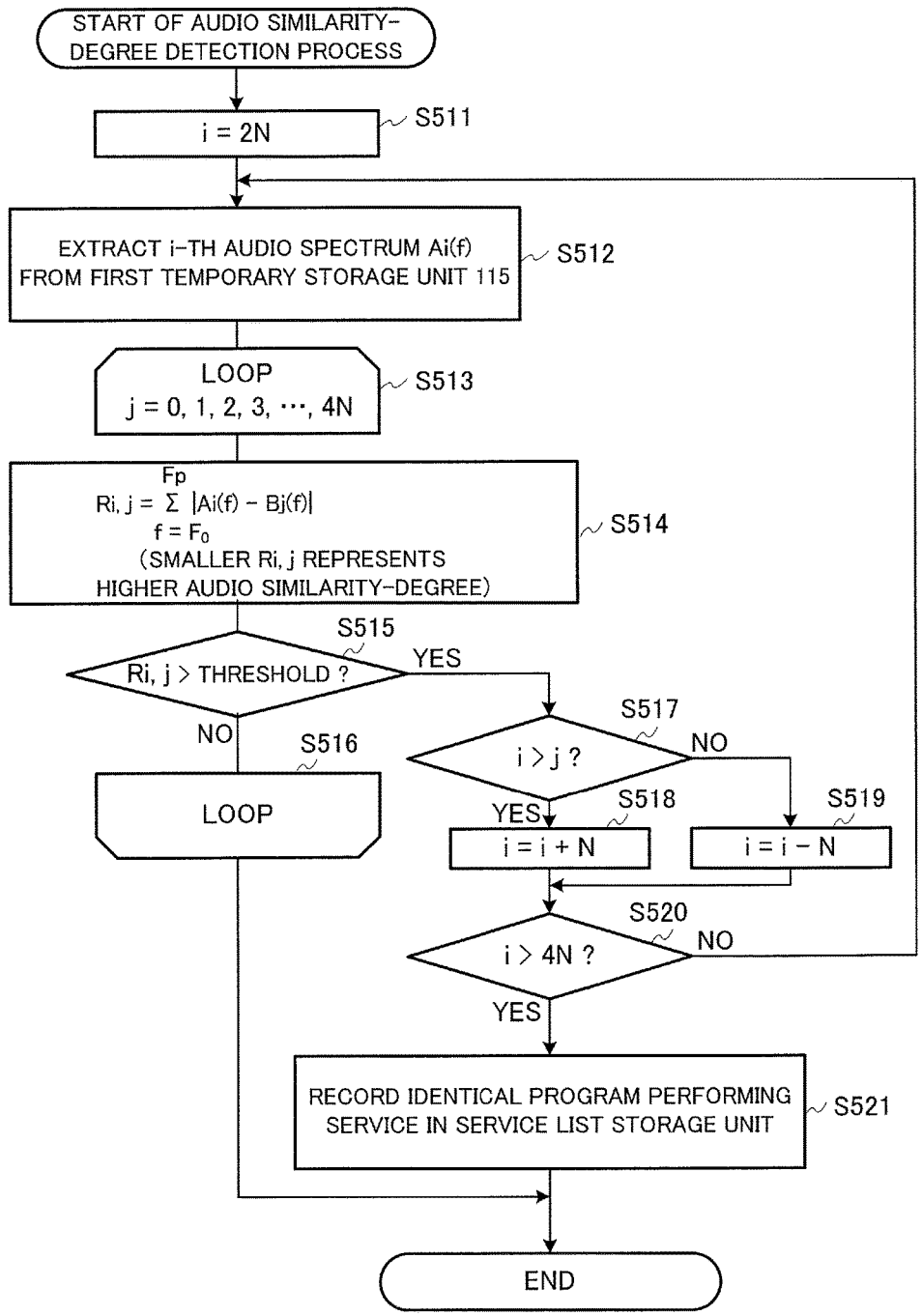

DIGITAL BROADCAST RECEPTION DEVICE AND CHANNEL SELECTION METHOD

TECHNICAL FIELD

The present invention relates to a digital broadcast reception device and a channel selection method.

BACKGROUND ART

Conventionally, when reception status of a broadcast program currently viewed or listened to on a broadcast reception device mounted on a mobile object deteriorates, it is necessary for a viewer/listener to search through channels of broadcast waves by manual operation and to find a channel of another broadcast wave that is currently broadcasting a program (hereinafter also referred to as an "identical program") of the same contents as the currently viewed/listened program. To eliminate the need of such manual operation, Patent Reference 1 proposes a digital broadcast reception device that finds a channel of another broadcast wave currently broadcasting an identical program on the basis of electronic program guide information and automatically selects this channel when the reception status of the currently viewed/listened program deteriorates.

Further, Non-patent Reference 1 mentions that a reception device for continuously receiving broadcast services from affiliated terrestrial broadcasters at the time of mobile reception for receiving a digital terrestrial television broadcast extending over a plurality of broadcast areas is capable of judging whether or not it is an affiliated broadcast from information of "affiliation_id" (affiliation identifier) in extended broadcaster descriptor, and information on respective broadcast frequencies of a currently received transport stream is included in program specific information (PSI). Furthermore, Non-patent Reference 2 mentions that information on respective broadcast frequencies of a currently received transport stream (TS) is included in program specific information.

PRIOR ART REFERENCE

Patent Reference

Patent Reference 1: Japanese Patent Application Publication No. 2007-36815 (paragraphs 0022 and 0058, for example).

Non-Patent Reference

Non-patent Reference 1: "Operational Guidelines for Digital Terrestrial Television Broadcasting, Technical Report, ARIB TR-B14, Edition 5.2 (Volume 2)", Association of Radio Industries and Businesses (Published in July 2013), Title 4 "Digital Terrestrial Television Broadcasting, PSI/SI Operational Guidelines", Part 1, 9.4 (from Page 4-34 to Page 4-36) and Part 1, 30.4 (Page 4-250).

Non-patent Reference 2: "ETSI EN 300 468 V1.11.1 (2010-04)", Digital Video Broadcasting (DVB) Specification for Service Information (SI) in DVB Systems, Chapter 6.2.13.4 "Terrestrial Delivery System Descriptor" (Page 48).

SUMMARY OF THE INVENTION

Problem to be Solved by the Invention

However, the above-described conventional channel detection methods making use of service information transmitted from broadcast stations (e.g., electronic program guide information, frequency information, program specific information, and the like) have a problem in that they are unusable in cases where the broadcast stations do not transmit such service information.

Further, while information usable for detecting identical programs is specified in some broadcast standards for fixed receivers and some broadcast standards for mobile broadcasting, even with the presence of those specifications, there are a lot of cases where such information is not transmitted from broadcast stations. In such cases, there is a problem that the automatic detection of identical programs is impossible. Incidentally, the broadcasting methods for fixed receivers include, for example, DVB-T (Digital Video Broadcasting-Terrestrial) and DVB-T2 employed in Europe and some other areas, DTMB (Digital Terrestrial Multimedia Broadcast) employed in China, ISDB-TB (Integrated Services Digital Broadcasting-Terrestrial Brazil) employed in South America, ATSC (Advanced Television Systems Committee standards) employed in the USA, and so forth. Broadcasting methods for mobile broadcasting include, for example, CMMB (China Mobile Multimedia Broadcasting) employed in China, DVB-H (Digital Video Broadcasting-Handheld) employed in Europe and some other areas, DMB•DAB (Digital Multimedia Broadcasting/Digital Audio Broadcast) employed in Europe, South Korea, and some other areas, ATSC-M/H (Advanced Television Systems Committee-Mobile/Handheld) employed in the USA, and so forth.

Between one-segment broadcasting and full-segment broadcasting according to ISDB-T (Integrated Services Digital Broadcasting-Terrestrial) and ISDB-TB, there are cases where the judgment on whether programs are identical programs or not can be made by referring to program names in the program identification information. However, there is a problem that the reception device cannot make the judgment on whether programs are identical programs or not when the program identification information is not transmitted in at least one of one-segment broadcasting and full-segment broadcasting, or when the program identification information in one-segment broadcasting and the program identification information in full-segment broadcasting differ from each other.

Furthermore, there is a problem that even when program names are used for making a judgment, between a broadcast program for fixed receivers and a broadcast program for mobile broadcasting (e.g., between DTMB and CMMB in China, between DVB-T2 and DVB-T in Europe and some other areas, between ATSC and ATSC-M/H in the USA, and so forth), whether or not the programs are identical programs, it is impossible to make the judgment whether or not the programs are identical programs in a case where the program names in program identification information do not agree though they are identical programs or in a case where the program names are written in different languages though they are identical programs. Moreover, there is a problem that the affiliated station information and the frequency information on relay stations described in Non-patent Reference 1 and the frequency information on relay stations described in Non-patent Reference 2 do not cover different broadcast standards, and thus the information cannot be used for the judgment of identical programs between broadcasting for fixed receivers and broadcasting for mobile broadcasting.

As described above, the aforementioned conventional broadcasting methods involve a problem in that there are many cases where the existence of an identical program cannot be detected when the reception status of the currently viewed/listened program deteriorates even with the presence of an excellently receivable broadcast wave of the identical program.

Thus the present invention is made to solve the above-described problems of the conventional art and an object of the present invention is to provide a digital broadcast reception device and a channel selection method, with which another channel broadcasting a program judged to be of the same contents as the currently viewed/listened program can be automatically detected and selected when the reception status of the channel of the broadcast wave deteriorates.

Means for Solving the Problem

According to an aspect of the present invention, a digital broadcast reception device includes: a first broadcast reception system that includes a first temporary storage unit, selects a channel of a broadcast wave, extracts first audio spectrum information from a first coded stream of the selected channel, and stores the extracted first audio spectrum information in the first temporary storage unit; a second broadcast reception system that includes a second temporary storage unit, successively selects channels of broadcast waves, successively extracts second audio spectrum information from second coded streams of the selected channels, and successively stores the extracted second audio spectrum information in the second temporary storage unit; an audio similarity-degree detection processor that successively generates values representing audio similarity-degrees between a first program containing the first audio spectrum information and a second program containing the second audio spectrum information, from the first audio spectrum information stored in the first temporary storage unit and the second audio spectrum information successively stored in the second temporary storage unit; a service list storage unit that stores a service list including information associating attached information extracted by the second broadcast reception system and the values representing the audio similarity-degrees successively generated by the audio similarity-degree detection processor with each other; and a reception monitoring unit that sends a notification signal representing deterioration of reception status to the first broadcast reception system when a value representing the reception status of the broadcast wave of the channel currently selected by the first broadcast reception system becomes lower than a preset reference value. Upon receiving the notification signal from the reception monitoring unit, the first broadcast reception system refers to the values representing the audio similarity-degrees in the service list stored in the service list storage unit, thereby judges a program which is most similar to the program of the channel currently selected by the first broadcast reception system as an identical program, and switches the currently selected channel to a channel judged as the identical program.

According to another aspect of the present invention, a channel selection method in a digital broadcast reception device that includes a first broadcast reception system that includes a first temporary storage unit, selects a channel of a broadcast wave, extracts first audio spectrum information from a first coded stream of the selected channel, and stores the extracted first audio spectrum information in the first temporary storage unit, and a second broadcast reception system that includes a second temporary storage unit, successively selects channels of broadcast waves, successively extracts second audio spectrum information from second coded streams of the selected channels, and successively stores the extracted second audio spectrum information in the second temporary storage unit. The method includes: a step of successively generates values representing audio similarity-degrees between a first program containing the first audio spectrum information and a second program containing the second audio spectrum information, from the first audio spectrum information stored in the first temporary storage unit and the second audio spectrum information successively stored in the second temporary storage unit; a step of generating a service list including information associating attached information extracted by the second broadcast reception system and the successively generated values representing the audio similarity-degree with each other and storing the service list in a service list storage unit; a step of sending a notification signal representing deterioration of reception status to the first broadcast reception system when a value representing the reception status of the broadcast wave of the channel currently selected by the first broadcast reception system becomes lower than a preset reference value; and a step of judging, as an identical program, a program which is most similar to a program of the channel currently selected by the first broadcast reception system, by referring to the values representing the audio similarity-degrees in the service list stored in the service list storage unit, and switching the currently selected channel to a channel judged as the identical program, when the first broadcast reception system receives the notification signal.

Effects of the Invention

According to the present invention, it is possible to detect a channel which broadcasts a program having an audio spectrum similar to an audio spectrum of a currently viewed/listened program, that is, a program judged to be an identical program, and to automatically select a channel which broadcasts the program judged to be the identical program when reception status of the currently viewed/listened program deteriorates. Therefore, according to the present invention, even when the reception status of the currently viewed/listened program deteriorates, a viewer/listener can continue viewing/listening to the program judged to be the identical program on another channel in good reception status.

BRIEF DESCRIPTION OF THE DRAWINGS

FIG. 1 is a block diagram schematically showing a configuration of a digital broadcast reception device according to a first embodiment of the present invention.

FIGS. 2(a) and 2(b) are diagrams showing an example and another example of a service list stored in a service list storage unit of the digital broadcast reception device according to the first embodiment.

FIGS. 5(a) to 5(d) are diagrams for explaining detection operation of audio similarity-degrees between first audio spectrum information and second audio spectrum information in the audio similarity-degree detection processor of the digital broadcast reception device according to the first embodiment.

FIGS. 6(a) to 6(c) are diagrams for explaining an example of a process of calculating an audio similarity-degree total value in the audio similarity-degree detection processor of the digital broadcast reception device according to the first embodiment.

FIG. 9 is a diagram showing an example of a service list stored in a service list storage unit of the digital broadcast reception device according to the second embodiment.

FIGS. 14(a) to 14(d) are diagrams for explaining detection operation of audio similarity-degrees between first audio spectrum information and second audio spectrum information in the audio similarity-degree detection processor of the digital broadcast reception device according to the third embodiment.

FIG. 18 is a diagram for explaining detection operation of audio similarity-degrees between first audio spectrum information and second audio spectrum information (operation in a case where the second audio spectrum information was stored at a time earlier than the first audio spectrum information) in an audio similarity-degree detection processor of the digital broadcast reception device according to the fifth embodiment.

FIG. 19 is a diagram for explaining detection operation of audio similarity-degrees between the first audio spectrum information and the second audio spectrum information (operation in a case where the second audio spectrum information was stored at a time later than the first audio spectrum information) in the audio similarity-degree detection processor of the digital broadcast reception device according to the fifth embodiment.

FIG. 20 is a flowchart schematically showing operation of the audio similarity-degree detection processor of the digital broadcast reception device according to the fifth embodiment.

MODE FOR CARRYING OUT THE INVENTION

First Embodiment

Figure 3:
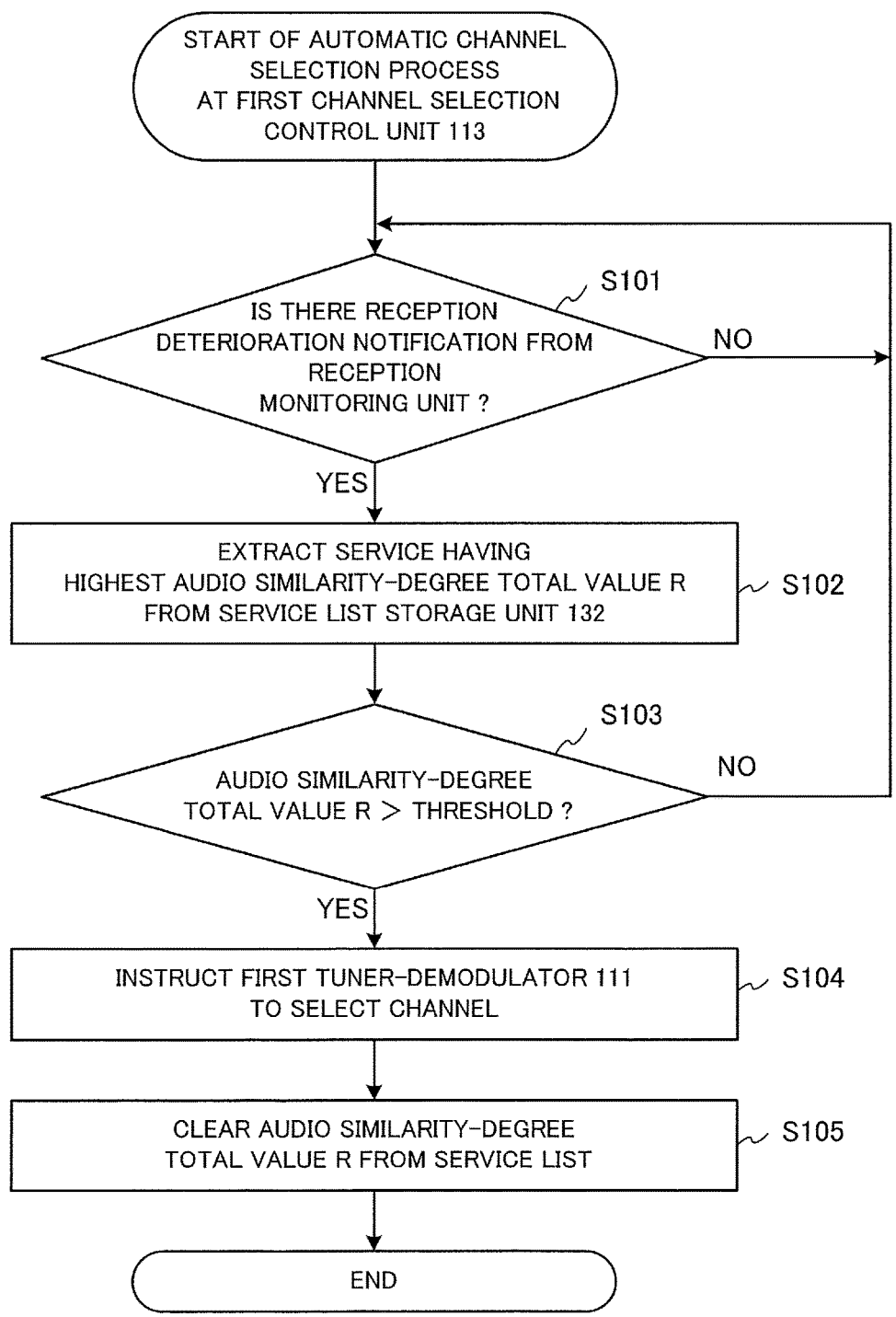
FIG. 3 is a flowchart schematically showing operation of a first channel selection control unit of the digital broadcast reception device according to the first embodiment.

FIG. 1 is a block diagram schematically showing a configuration of a digital broadcast reception device 100 according to a first embodiment of the present invention. The digital broadcast reception device 100 is a device capable of executing a channel selection method according to the first embodiment. As shown in FIG. 1, the digital broadcast reception device 100 includes a first tuner-demodulator 111 that generates a first demodulated signal C1 by making channel selection from broadcast waves RF input via an antenna and performing demodulation on a signal of the selected channel, a first channel selection control unit 113 that controls the channel selection made by the first tuner-demodulator 111, and a first demultiplexer 112 that extracts a first video-audio coded stream C2 from the first demodulated signal C1 generated by the first tuner-demodulator 111. The digital broadcast reception device 100 further includes a video-audio decoder 116 that generates a video-audio signal C5 by decoding the first video-audio coded stream C2, a first extraction unit 114 that extracts first audio spectrum information C3 from the first video-audio coded stream C2 extracted by the first demultiplexer 112, and a first temporary storage unit 115 that temporarily stores the first audio spectrum information C3 extracted by the first extraction unit 114. The above components 111 to 116 constitute a first broadcast reception system 110.

Further, as shown in FIG. 1, the digital broadcast reception device 100 includes a second tuner-demodulator 121 that generates a second demodulated signal D1 by making channel selection from the broadcast waves RF input via the antenna and performing demodulation on a signal of the selected channel, a second channel selection control unit 123 that controls the channel selection so that the second tuner-demodulator 121 successively switches channels (that is, searches through broadcast waves of a predetermined broadcasting method in a predetermined frequency range), and a second demultiplexer 122 that successively extracts second video-audio coded streams D2 and attached information D5 on broadcast programs from the second demodulated signals D1 successively generated by the second tuner-demodulator 121. The digital broadcast reception device 100 further includes a second extraction unit 124 that successively extracts second audio spectrum information D3 from the second video-audio coded streams D2 successively extracted by the second demultiplexer 122, and a second temporary storage unit 125 that temporarily stores the second audio spectrum information D3 successively extracted by the second extraction unit 124. The above components 121 to 125 constitute a second broadcast reception system 120 that makes a channel search for finding another channel currently broadcasting a program (identical program) of the same contents as a program being output from the first broadcast reception system 110.

Furthermore, as shown in FIG. 1, the digital broadcast reception device 100 includes an audio similarity-degree detection processor 131 that reads out the first audio spectrum information stored in the first temporary storage unit 115 and the second audio spectrum information stored in the second temporary storage unit 125, and successively generates values E1 (e.g., audio similarity-degree total values R which will be described later) representing a degree of similarity of audio spectrums (hereinafter also referred to as an "audio similarity-degree") between a first program containing first audio spectrum information C4 and a second program containing second audio spectrum information D4. The digital broadcast reception device 100 further includes a service list storage unit 132 that stores a service list that contains information associating the attached information D5 as service information successively extracted by the second demultiplexer 122 and the values E1 representing the audio similarity-degree which are successively generated by the audio similarity-degree detection processor 131 with each other. The digital broadcast reception device 100 also includes a reception monitoring unit 133 that sends a notification signal G1 representing deterioration in reception status to the first channel selection control unit 113 when a value representing the reception status of the broadcast wave RF of the channel currently selected by the first tuner-demodulator 111 becomes lower than a preset reference value, and a control unit 134 that controls operation of the entire device with a control signal F1. Upon receiving the notification signal G1 from the reception monitoring unit 133, the first channel selection control unit 113 refers to the service list stored in the service list storage unit 132 and thereby selects another channel currently broadcasting a program judged to be an identical program.

Next, the configuration and operation of the digital broadcast reception device 100 will be described below in more detail. The first channel selection control unit 113 controls the channel selection by the first tuner-demodulator 111 in accordance with a control signal sent out from the control unit 134 in response to user's operation and the like, and when receiving the notification signal G1 from the reception monitoring unit 133, generates a command signal for commanding the channel selection by the first tuner-demodulator 111 based on the service list stored in the service list storage unit 132.

The first tuner-demodulator 111 receives the command signal generated by the first channel selection control unit 113, tunes itself to a desired physical channel corresponding to the command signal, receives and demodulates a digital broadcast such as digital television broadcast or digital radio broadcast, and thereby generates the first demodulated signal C1.

The first demultiplexer 112 receives the first demodulated signal C1 generated by the first tuner-demodulator 111 and generates the first video-audio coded stream C2 containing a video coded stream and an audio coded stream from the first demodulated signal C1.

The video-audio decoder 116 receives the first video-audio coded stream C2 generated by the first demultiplexer 112 and generates the video-audio signal C5 by decoding the first video-audio coded stream C2. The video-audio signal C5 is supplied to an external device, for example. The external device is a video display device including a display unit such as a liquid crystal monitor, an audio output device including an audio output unit such as a speaker, and the like, for example. In this case, the user can view video images displayed on the video display device and listen to sound output from the audio output device. The digital broadcast reception device may be a digital television set including the video display device and the audio output device, or a video recorder including means for recording video signals and audio signals on an information recording medium.

The first extraction unit 114 extracts the first audio spectrum information C3 from the first video-audio coded stream C2 regarding the currently viewed/listened program. The first temporary storage unit 115 temporarily stores the first audio spectrum information C3 regarding the currently viewed/listened program. The extraction of the first audio spectrum information C3 by the first extraction unit 114 and the storage of the first audio spectrum information C3 by the first temporary storage unit 115 are successively carried out at predetermined time intervals, for example. The first temporary storage unit 115 updates the stored audio spectrum information so that a predetermined number of pieces of first audio spectrum information, whose pieces are orderly counted from a newest piece of the information, are stored, for example.

In parallel with the process for outputting the video-audio signal C5 by the first broadcast reception system 110, the second broadcast reception system 120 executes a process of successively searching for other receivable channels (hereinafter also referred to as a "background scan process"). For example, the second broadcast reception system 120 gathers attached information (e.g., service lists, electronic program guide information, program specific information, program identification information, and the like) contained in the broadcast waves RF. The second channel selection control unit 123 executes channel selection control for the background scan process and the attached information gathering. If no service list has been gathered yet, the second channel selection control unit 123 successively gives channel selection instructions to the second tuner-demodulator 121 in ascending order of physical channel number in a frequency band, for example, and keeps tuning for gathering and monitoring necessary information at each physical channel number for several seconds. From the signal demodulated by the second tuner demodulator 121, the attached information as the service information is extracted by the second demultiplexer 122, and the extracted attached information is stored in the service list storage unit 132. The attached information stored in the service list storage unit 132 is displayed as a receivable broadcast service list and a program table. Even after a set of information necessary for forming the service list regarding the predetermined frequency band has been gathered, the second channel selection control unit 123 continues the background scan process in order to update the attached information and in order to monitor changes in the receivable broadcast waves due to movement between broadcast areas and the like.

The first extraction unit 114 analyzes an audio compressed stream which is an audio stream in the stream separated by the first demultiplexer 112, and extracts the first audio spectrum information C3. The second extraction unit 124 analyzes an audio compressed stream which is an audio stream in the stream separated by the second demultiplexer 122, and extracts the second audio spectrum information D3. In various audio compression coding methods used for digital broadcasting, an analog audio signal is converted into a PCM (Pulse Code Modulation) digital signal by an A/D (analog-to-digital) conversion process, and the PCM digital signal is converted into data in a frequency domain by MDCT (Modified Discrete Cosine Transform). MDCT coefficients obtained in this way represent the power value of each frequency component of the audio signal. Thereafter, the MDCT coefficients are encoded by performing quantization at each frequency and deletion of unnecessary information by use of the difference in the power density between frequencies or an auditory model of the human. The first extraction unit 114 and the second extraction unit 124 extract, from the audio compressed stream containing the MDCT coefficients, the first audio spectrum information on the currently viewed/listened program and the second audio spectrum information on a program other than the currently viewed/listened program, respectively.

The first audio spectrum information extracted by the first extraction unit 114 is temporarily stored in the first temporary storage unit 115, while the second audio spectrum information extracted by the second extraction unit 124 is temporarily stored in the second temporary storage unit 125.

These stored pieces of information are cleared when the reception stream in the first broadcast reception system 110 or the second broadcast reception system 120 is switched by channel selection to another stream, for example. Each of the first temporary storage unit 115 and the second temporary storage unit 125 is sufficient to have a storage capacity enough for temporarily storing an audio stream for several seconds, for which the physical channel is maintained for the acquisition of the service information in the background scan process.

The reason for temporarily storing audio streams in the first temporary storage unit 115 and the second temporary storage unit 125 is that there are cases where a temporal deviation of several seconds, for example, exists between identical programs which differs in the physical channel number and the audio similarity-degree detection processor 131 searches the first temporary storage unit 115 and the second temporary storage unit 125 (i.e., buffers) for data of audio parts of identical scenes of identical programs. This temporal deviation includes a deviation component caused by the difference in the broadcast standards such as difference between encoding methods and difference between modulation methods and a deviation component caused by delay variation in a process in a relay station and the demodulation process.

The audio similarity-degree detection processor 131 calculates the audio similarity-degree of a second audio spectrum information group (each of multiple pieces of second audio spectrum information) in the second temporary storage unit 125, with respect to the first audio spectrum information in the first temporary storage unit 115 at a certain time point, and a value E1 representing the audio similarity-degree (audio similarity-degree values $R_{i,j}$, an audio similarity-degree total value R which is a total value of the audio similarity-degree values, and the like). The details of the calculation of the audio similarity will be described later. Programs of high audio similarity-degrees, i.e., programs of which values representing their audio similarity-degrees are higher than a predetermined reference value, are judged as identical programs. A total value of the values representing the audio similarity-degrees obtained by the calculation is defined to be an audio similarity-degree total value R, and is stored in the service list in the service list storage unit 132 in association with the attached information, for example.

FIGS. 2(a) and 2(b) are diagrams showing an example (service list 140) and another example (service list 141) of the service list stored in the service list storage unit 132 of the digital broadcast reception device 100 according to the first embodiment. As shown in FIG. 2(a), the service list storage unit 132 stores, for example, a service list 140 that associates the attached information (such as service name, service ID, and physical channel number) detected by the background scan process with the audio similarity-degree total value R obtained by the calculation by the audio similarity-degree detection processor 131.

The reception monitoring unit 133 monitors the reception status such as a reception level and a bit error rate in the first tuner-demodulator 111 in order to monitor the reception status of the currently viewed/listened program. The reception monitoring unit 133 sends the notification signal G1 representing deterioration in the reception status to the first channel selection control unit 113 when the reception status in the first tuner-demodulator 111 is judged to have deteriorated (e.g., when the reception level drops below a predetermined threshold value or when the bit error rate exceeds a predetermined threshold value).

The reception monitoring unit 133 may monitor both the reception status such as the reception level and the bit error rate in the first tuner-demodulator 111 and the reception status such as the reception level and the bit error rate in the second tuner-demodulator 121. In this case, the reception monitoring unit 133 is configured to send the notification signal G1 for notifying the deterioration in the reception status to the first channel selection control unit 113 when the reception status of the program demodulated by the second tuner-demodulator 121 is better than the reception status of the currently viewed/listened program and a program judged to be an identical program is currently received by the second broadcast reception system 120. In a case where such a configuration is employed, since it is possible to automatically select a channel in better reception status even if the reception status slightly deteriorates, better reception status can be maintained in comparison with a case where the reception status in the first tuner-demodulator 111 is compared with a predetermined threshold value (a constant value).

FIG. 3 is a flowchart schematically showing operation of the first channel selection control unit 113 of the digital broadcast reception device 100 according to the first embodiment. As shown in FIG. 3, upon receiving the notification signal (reception deterioration notification) G1 for notifying deterioration in the reception status from the reception monitoring unit 133 (step S101), the first channel selection control unit 113 refers to the service list 140 or 141 in the service list storage unit 132, refers to the audio similarity-degree total value R which is recorded in association with the service information, and extracts a broadcast service having the highest audio similarity-degree total value R (step S102). When the extracted audio similarity-degree total value R is larger than a certain threshold value (e.g., a predetermined threshold value) (step S103), the first channel selection control unit 113 acquires a physical channel number that has been stored in association with the broadcast service from the service list 140, and instructs the first tuner-demodulator 111 to select the broadcast station (relay station) having this physical channel number (step S104).

Since the currently viewed/listened program is switched to a program on a different broadcast wave judged as an identical program by the above process, the audio similarity-degree total value R in the service list 140 stored in the service list storage unit 132 and the information temporarily stored in the first temporary storage unit 115 are cleared (step S105). The process of clearing these pieces of information is also executed at times other than a time of an automatic switching to a program judged as an identical program, for example, when the viewed/listened program is switched by an operation by the viewer/listener. Before clearing these pieces of information, in regard to the broadcast service whose audio similarity-degree total value R was the largest, it is also acceptable to add a column of items representing other broadcast services broadcasting programs judged as identical programs (i.e., information indicating that the program has been judged as an identical program) to the service list 140 like the rightmost column of the service list 141 shown in FIG. 2(b), thereby store the information indicating that a program has previously been judged as an identical program, and thereafter refer to the information and utilize the information for the switching to an identical program. For example, when there exist a plurality of programs judged as identical programs, it is possible to use the service list 141 by referring to the information in the rightmost column of the service list 141 and preferentially selecting a program that has previously been judged as an identical program. Further, when there exists no program judged as an identical program, for example, it is possible to use the service list 141 by referring to the information in the rightmost column of the service list 141 and selecting a program that has previously been judged as an identical program.

Figure 4:
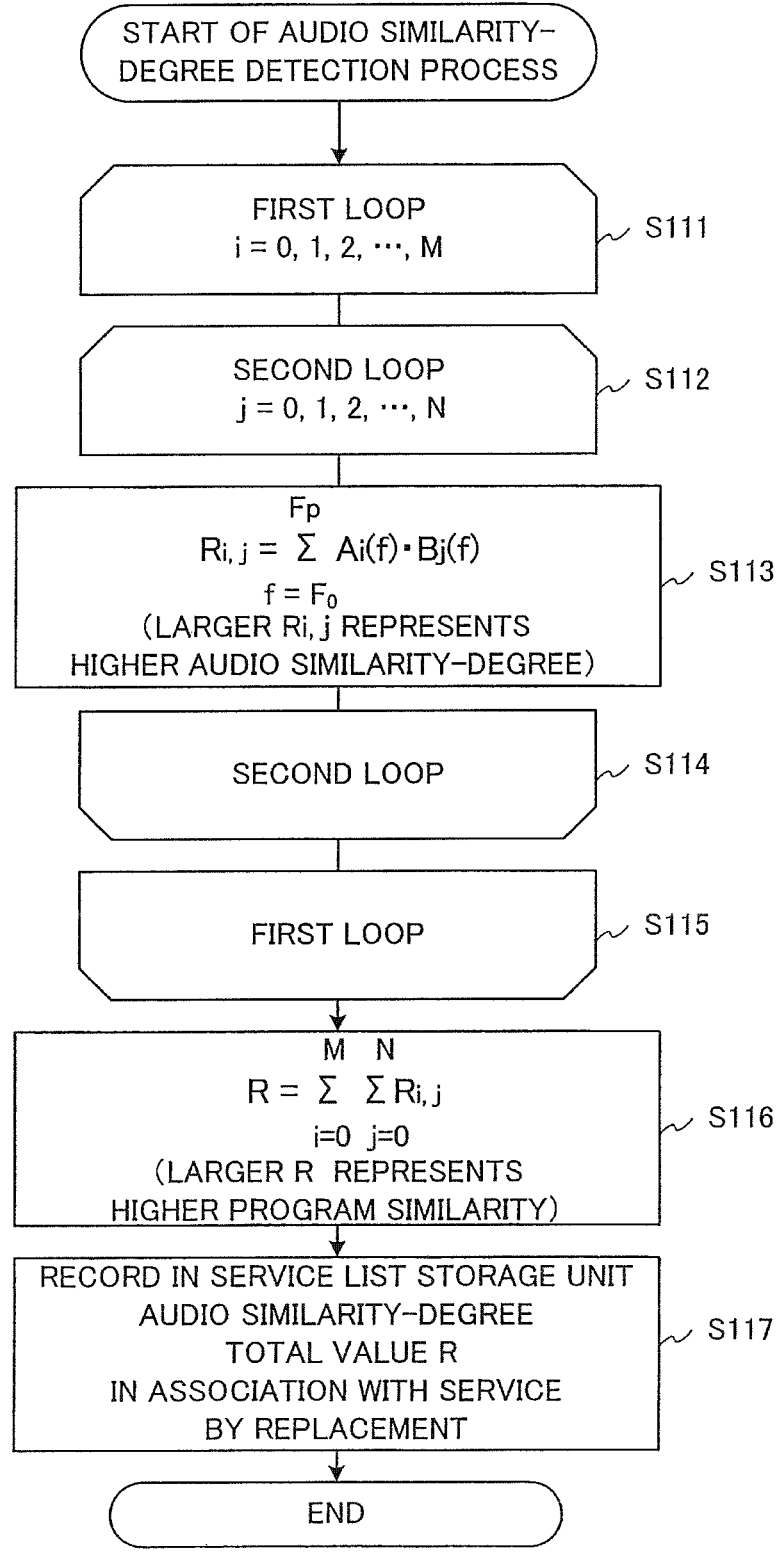
FIG. 4 is a flowchart schematically showing operation of an audio similarity-degree detection processor of the digital broadcast reception device according to the first embodiment.

FIG. 4 is a flowchart schematically showing operation of the audio similarity-degree detection processor 131 of the digital broadcast reception device 100. FIGS. 5(a) to 5(d) are diagrams for explaining detection operation of audio similarity-degrees from the first audio spectrum information A(f) and the second audio spectrum information B(f) in the audio similarity-degree detection processor 131 of the digital broadcast reception device 100.

In response to a channel selection command signal by the background scan process in the second broadcast reception system 120 (e.g., a command signal from the control unit 134), the second extraction unit 124 stores the first piece of data of a certain broadcast service in the second temporary storage unit 125. At this point in time, the second extraction unit 124 sends a command signal for commanding the start of the audio similarity-degree detection process to the audio similarity-degree detection processor 131. On the other hand, during the program viewing/listening, the first extraction unit 114 constantly extracts the first audio spectrum information A(f) and stores the extracted first audio spectrum information A(f) in the first temporary storage unit 115. The first temporary storage unit 115 stores M+1 pieces of first audio spectrum information $A_i(f)$ in a time series. Here, i=0, 1, 2, . . . , M. M is a preset positive integer. Likewise, the second temporary storage unit 125 stores N+1 pieces of second audio spectrum information $B_j(f)$ in a time series. Here, j=0, 1, 2, . . . , N. N is a preset positive integer.

Upon receiving the command signal for commanding the start of the audio similarity-degree detection process, the audio similarity-degree detection processor 131 executes the audio similarity-degree detection process shown in FIG. 4. As shown in FIG. 4, in step S111, the audio similarity-degree detection processor 131 extracts an i-th (i=0, 1, 2, . . . , M) piece of first audio spectrum information $A_i(f)$ from the first audio spectrum information A(f) stored in the first temporary storage unit 115 (i=0 at the start of a first loop), and then performs a process of detecting whether or not second audio spectrum information $B_j(f)$ having high audio similarity-degree to the extracted one exists in the second temporary storage unit 125. Accordingly, the audio similarity-degree detection processor 131 extracts, in step S112, a j-th (j=0, 1, 2, . . . , N) piece of second audio spectrum information $B_j(f)$ from the second audio spectrum information B(f) stored in the second temporary storage unit 125, and performs, in step S113, a calculation for determining an audio similarity-degree values $R_{i,j}$ by using the following expression (1).

$$R_{i,j} = \sum_{f=F0}^{Fp} A_i(f) \cdot B_j(f) \quad (1)$$

This calculation is performed repeatedly for all of the N+1 pieces of second audio spectrum information $B_j(f)$ stored in the second temporary storage unit 125 by the second loop in step S112 to step S114.

Subsequently, the next piece of first audio spectrum information among the pieces of first audio spectrum information stored in the first temporary storage unit 115 is extracted (the piece of first audio spectrum information is extracted as a value obtained by incrementing the value of i by one), and with respect to the new piece of first audio spectrum information, audio similarity-degree calculation is performed for every piece of second audio spectrum information $B_j(f)$ in the second temporary storage unit 125 (steps S112 to S114).

When the audio similarity-degree calculation is completed for all of the pieces of first audio spectrum information $A_i(f)$ in the first temporary storage unit 115 (step S115), the audio similarity-degree total value R of all the calculated audio similarity-degree values $R_{i,j}$ is obtained in step S116 according to the following expression (2):

$$R = \sum_{i=0}^{M} \sum_{j=0}^{N} R_{i,j} \quad (2)$$

Then, in step S117, the audio similarity-degree total value R is recorded in the service list storage unit 132 in association with the broadcast service which is selected and detected by the background scan process in the second broadcast reception system 120.

FIGS. 6(a) to 6(c) are diagrams for explaining an example of the process of calculating the audio similarity-degree total value R in the audio similarity-degree detection processor 131 of the digital broadcast reception device 100. The audio similarity-degree calculation process shown in FIG. 4 will be described below with reference to FIGS. 6(a) to 6(c). FIG. 6(a) shows the first audio spectrum information $A_i(f)$ stored in the first temporary storage unit 115 in three-dimensional representation with a time axis, a power axis and a frequency axis. The 0-th audio spectrum is the oldest frequency spectrum, and the M-th audio spectrum is the newest frequency spectrum. The i-th frequency spectrum is input from the first extraction unit 114 at a certain time, and its audio frequency components are indicated by the i-th frequency spectrum in FIG. 6(a).

FIG. 6(b) shows, in a similar way to FIG. 6(a), the second audio spectrum information stored in the second temporary storage unit 125 in three-dimensional representation with a time axis, a power axis and a frequency axis. In step S111 in FIG. 4, the audio similarity-degree detection processor 131 sets i=0, first extracts a 0-th piece of first audio spectrum information $A_0(f)$ from the first temporary storage unit 115, and then performs, with regard to this, calculations to determine audio similarity-degree values $R_{i,j}$ (i.e., $R_{0,0}$ to $R_{M,N}$ shown in FIG. 6(c)) for all the pieces of second audio spectrum information $B_0(f)$ to $B_N(f)$ stored in the second temporary storage unit 125. The audio similarity-degree detection processor 131, at first, sets j=0 in step S112, extracts the 0-th piece of second audio spectrum information $B_0(f)$ from the second temporary storage unit 125, and determines the audio similarity-degree value $R_{1,0}$ (i.e., $R_{0,0}$) through the calculation in step S113. This is the process corresponding to P0 in FIGS. 6(a) to 6(c) and thus the audio similarity-degree value $R_{0,0}$ is obtained.

In step S114, the audio similarity-degree detection processor 131 returns to the start of the second loop, extracts the next 1st piece of second audio spectrum information from the second temporary storage unit 125, and determines the audio similarity-degree value $R_{i,1}$ (i.e., $R_{0,1}$) in step S113. This is the process corresponding to P1 in FIGS. 6(a) to 6(c) and thus the audio similarity-degree value $R_{0,1}$ is obtained. The audio similarity-degree detection processor 131 thus performs all processes of the second loop from steps S112 to S114, it means that processes P0, P1, ..., Pj, ..., PN are completed in FIGS. 6(a) to 6(c), and therefore the audio similarity-degree values $R_{0,0}, R_{0,1}, \ldots, R_{0,j}, \ldots, R_{0,N}$ are obtained. That is, the audio similarity-degree detection processor 131 obtains the respective audio similarity-degree values $R_{0,0}, R_{0,1}, \ldots, R_{0,j}, \ldots, R_{0,N}$ between the first audio spectrum information $A_0(f)$ stored in the first temporary storage unit 115 and every piece of second audio spectrum information $B_0(f)$ to $B_N(f)$ stored in the second temporary storage unit 125.

Next, the audio similarity-degree detection processor 131 returns to the start of the first loop in step S115, increments the value of i by one (i.e., sets i=1) in step S111, and extracts the next 1st piece of first audio spectrum information $A_1(f)$ from the first temporary storage unit 115. Then, the audio similarity-degree detection processor 131 obtains the audio similarity-degree values $R_{1,1}, \ldots, R_{1,j}, \ldots, R_{1,N}$ through the processes of the second loop of step S112 to step S114. Thus, the first loop executed by the audio similarity-degree detection processor 131 successively determines the audio similarity-degree between every piece of first audio spectrum information $A_i(f)$ in the first temporary storage unit 115 and every piece of second audio spectrum information $B_j(f)$ in the second temporary storage unit 125. After all the processes of the first loop are completed, the audio similarity-degree detection processor 131 obtains the audio similarity-degree values $R_{0,0}$ to $R_{M,N}$ shown in FIG. 6(c). In step S116, the audio similarity-degree detection processor 131 determines the audio similarity-degree total value R which is the total value of the audio similarity-degree values $R_{0,0}$ to $R_{M,N}$. The audio similarity-degree total value R is a value representing the audio similarity-degree between the audio spectrum information on the currently viewed/listened program stored in the first temporary storage unit 115 in a certain time period and audio spectrum information on a program in a certain broadcast service selected by the background scan process performed by the second broadcast reception system 120 in the second temporary storage unit 125 in the same certain time period. If these programs are identical programs, the audio similarity-degree total value R is a remarkably large value. There is a time difference of several seconds between these programs in usual, however, since there is a size enough to store the first audio spectrum information for several seconds in each of the first temporary storage unit 115 and second temporary storage unit 125, identical audio scenes can be detected by performing the processes of the first loop (steps S111 to S115) and the second loop (steps S112 to S114) in FIG. 4, and the audio similarity-degree total value R is a remarkably large value also in this case. The audio similarity-degree detection processor 131 stores the audio similarity-degree total value R obtained as above in the service list storage unit 132 while associating it with the broadcast service currently received by the second broadcast reception system 120 (step S117).

Thereafter, when the channel that has been selected by the background scan process performed by the second broadcast reception system 120 is switched to a next channel and another broadcast service is newly received successfully, the audio similarity-degree detection processor 131 performs, in step S111 to step S117, the process of calculating the audio similarity-degree total value R between the new broadcast service and the currently viewed/listened program and performs the process of storing the calculated audio similarity total value R in the service list. As described above, in regard to all the receivable broadcast services, the audio similarity-degree detection processor 131 successively stores the audio similarity-degrees to the currently viewed/listened program in the service list in the service list storage unit 132.

Next, the calculation in step S113 will be described below. The audio similarity-degree detection processor 131 calculates the product of the i-th piece of first audio spectrum information $A_i(f)$ stored in the first temporary storage unit 115 and the j-th piece of second audio spectrum information $B_j(f)$ stored in the second temporary storage unit 125 in regard to a certain frequency f, and performs this calculation for all the frequency components, and the resultant sum total is obtained as the audio similarity-degree value $R_{i,j}$ regarding certain i and j. Incidentally, even in the case of identical programs, if their audio levels differ or if they are broadcasted in different audio encoding methods, it is conceivable that absolute values of the audio spectrum information may differ. On the supposition of such a case, the audio similarity-degree detection processor 131 may use, as the first audio spectrum information $A_i(f)$ and the second audio spectrum information $B_j(f)$, audio spectrum information normalized by dividing the audio spectrum information at each frequency by the total power value obtained by the summation.

The above process of calculating the sum of products will be described below with reference to FIGS. 5(a) to 5(d). In FIGS. 5(a) to 5(d), the first audio spectrum information $A_i(f)$ and the second audio spectrum information $B_j(f)$ are indicated while setting their average values at the zero level. FIG. 5(a) shows power values of respective frequency components with regard to a certain i-th piece of the first audio spectrum information $A_i(f)$ among the first audio spectrum information A(f) on the currently viewed/listened program and the horizontal axis represents frequency therein. FIG. 5(b) shows the second audio spectrum information B(f) on a certain program detected by the channel selection in the background scan process executed by the second broadcast reception system 120, and shows, in the left column, power values of respective frequency components of the first (0-th) piece $B_0(f)$ extracted from the information. FIG. 5(c) shows values each obtained by multiplying frequency components of $A_i(f)$ and $B_0(f)$ at the same frequency in the calculation in step S113. FIG. 5(d) shows the value obtained by adding the frequency components of $A_i(f) \cdot B_0(f)$ which are obtained in FIG. 5(c) with regard to all the frequencies (with regard to eight frequencies, the number equal to the number of arrows, in FIGS. 5(a) to 5(d)).

Similarly, the second column from the left shows the result of the similar sum-of-products calculation in step S113 with regard to the i-th piece of first audio spectrum information $A_i(f)$ stored in the first temporary storage unit 115 and the first piece of second audio spectrum information $B_1(f)$ stored in the second temporary storage unit 125.

FIGS. 5(a) to 5(d) show how the sum-of-products calculation in step S113 is performed in this way with regard to all the pieces of the second audio spectrum information stored in the second temporary storage unit 125. As shown in the 2nd column from the left in FIGS. 5(a) to 5(d), when the first audio spectrum information $A_i(f)$ and the second audio spectrum information $B_1(f)$ perfectly match, the value shown in FIG. 5(d) (the audio similarity-degree value in the first embodiment) is largest and the similarity-degree between both the audio spectrums is highest. In contrast, when the programs are not identical with each other, the value shown in FIG. 5(d) (the audio similarity-degree value in the first embodiment) is a small value and the similarity-degree between the audio spectrums is low. When the same scene as a certain scene of the currently viewed/listened program exists in the second temporary storage unit 125, the value of FIG. 5(d) becomes remarkably large as in this example. As described above, a program judged as an identical program can be detected by the calculation in step S113.

The audio similarity-degree total value R of all the audio similarity-degree values $R_{i,j}$ is calculated in step S116. When the program being judged is truly an identical program, the audio similarity-degree becomes high in a plurality of scenes and thus the audio similarity-degree total value R is obtained as a large value. Therefore, there is an effect of preventing erroneous judgment misjudging a different program as an identical program just because the audio similarity-degree in a particular scene was accidentally high.

Figure 7A:
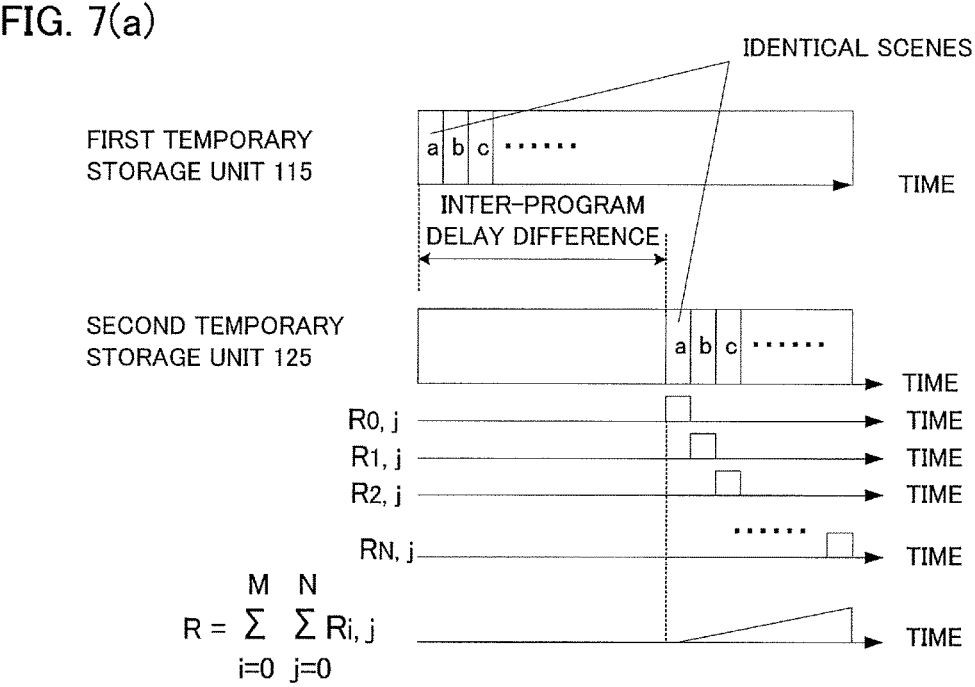
FIGS. 7(a) and 7(b) are diagrams showing time differences between the first audio spectrum information stored in a first temporary storage unit and the second audio spectrum information stored in a second temporary storage unit and the audio similarity-degree total values, in the digital broadcast reception device according to the first embodiment.
Figure 7B:
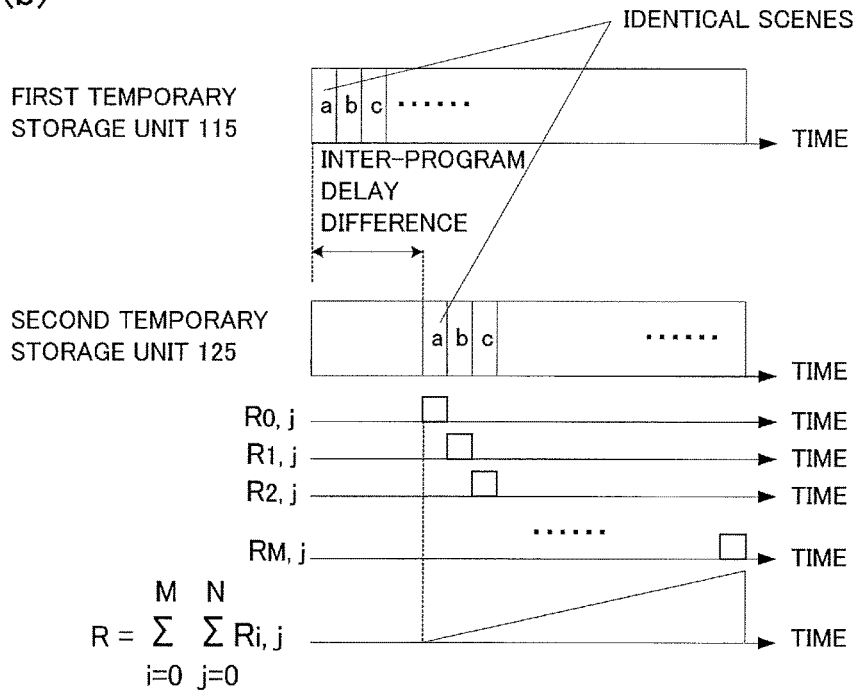

FIGS. 7(a) and 7(b) are diagrams showing the time difference between the first audio spectrum information stored in the first temporary storage unit 115 and the second audio spectrum information stored in the second temporary storage unit 125 and the audio similarity-degree total value R, in the digital broadcast reception device 100 according to the first embodiment. Next, an effect of determining the audio similarity-degree total value R in step S116 will be described below. In cases where the programs are identical programs, FIG. 7(a) shows a case where the delay difference between the programs is large, while FIG. 7(b) shows a case where the delay difference is small. It can be seen that the audio similarity-degree total value R becomes large when the delay difference between the programs is small in comparison with the case where the delay difference between the programs is large. Therefore, there is an effect that by having the first channel selection control unit 113 select a large audio similarity-degree total value R in the selection of the destination of channel selection for an identical program, the currently viewed/listened program can be automatically switched to a program having less delay, and the feeling of strangeness to the viewer/listener (user) can be reduced.

As described above, according to the digital broadcast reception device 100 and the channel selection method according to the first embodiment, it is possible to detect a channel broadcasting a program having an audio spectrum similar to the audio spectrum of the currently viewed/listened program, i.e., a channel broadcasting a program judged to be an identical program, and to automatically select the channel broadcasting the program judged to be an identical program when reception status of the currently viewed/listened program deteriorates. That is, since a program judged to be an identical program is detected by using the first audio spectrum information and the second audio spectrum information, a program having a high probability of being an identical program can be detected independently of the broadcasting method and the operational status of transmission of additional information. As above, with the digital broadcast reception device 100 according to the first embodiment, there is an effect that even when the reception status of the currently viewed/listened program deteriorates, the viewer/listener can continue viewing/listening to a program on another channel which is judged to be an identical program in good reception status.

Further, since MDCT coefficients are extracted from the audio compressed streams by the first extraction unit 114 and the second extraction unit 124 and are used for the calculation of the audio similarity-degree, there is an effect that the need of audio decoding processing in the second broadcast reception system 120 is eliminated, a second audio decoder is unnecessary, and the identical program detection can be carried out with a low CPU load. Incidentally, the MDCT coefficients are commonly used in various types of audio coded streams transmitted in digital broadcasting. By using the MDCT coefficients even when the broadcasting method varies, there is an effect that the audio spectrum information can be gathered efficiently with a low CPU load by the same process independently of the broadcast standard.

Furthermore, since the first temporary storage unit 115 and the second temporary storage unit 125 are provided and the audio similarity-degree values of the audio spectrum information deviated from each other in the time direction in these storage units are calculated, there is an effect that an identical program can be detected successfully even when a delay exists between the currently viewed/listened program and the identical program on a different channel.

Furthermore, since the audio similarity-degree detection processor 131 executes the calculation in step S113 (FIG. 4), there is an effect that an identical program can be detected.

Moreover, the audio similarity-degree detection processor 131 calculates the audio similarity-degree total value R of all the audio similarity-degree values $R_{i,j}$ in step S116 and records the audio similarity-degree total value R in the service list storage unit 132 while associating it with the broadcast service. The first channel selection control unit 113 judges a broadcast service having a large audio similarity-degree total value R as an identical program. Therefore, there is an effect of preventing erroneous judgment misjudging a different program as an identical program just because the audio similarity-degree in a particular scene was accidentally high.

Moreover, the audio similarity-degree detection processor 131 calculates the audio similarity-degree total value R of all the audio similarity-degree values $R_{i,j}$ in step S116, and the first channel selection control unit 113 selects a large audio similarity-degree total value R in the selection of the destination of channel selection for an identical program. Therefore, there is an effect that the currently viewed/listened program can be automatically switched to a program having less delay and the feeling of strangeness to the viewer/listener can be reduced.

Second Embodiment

Figure 8:
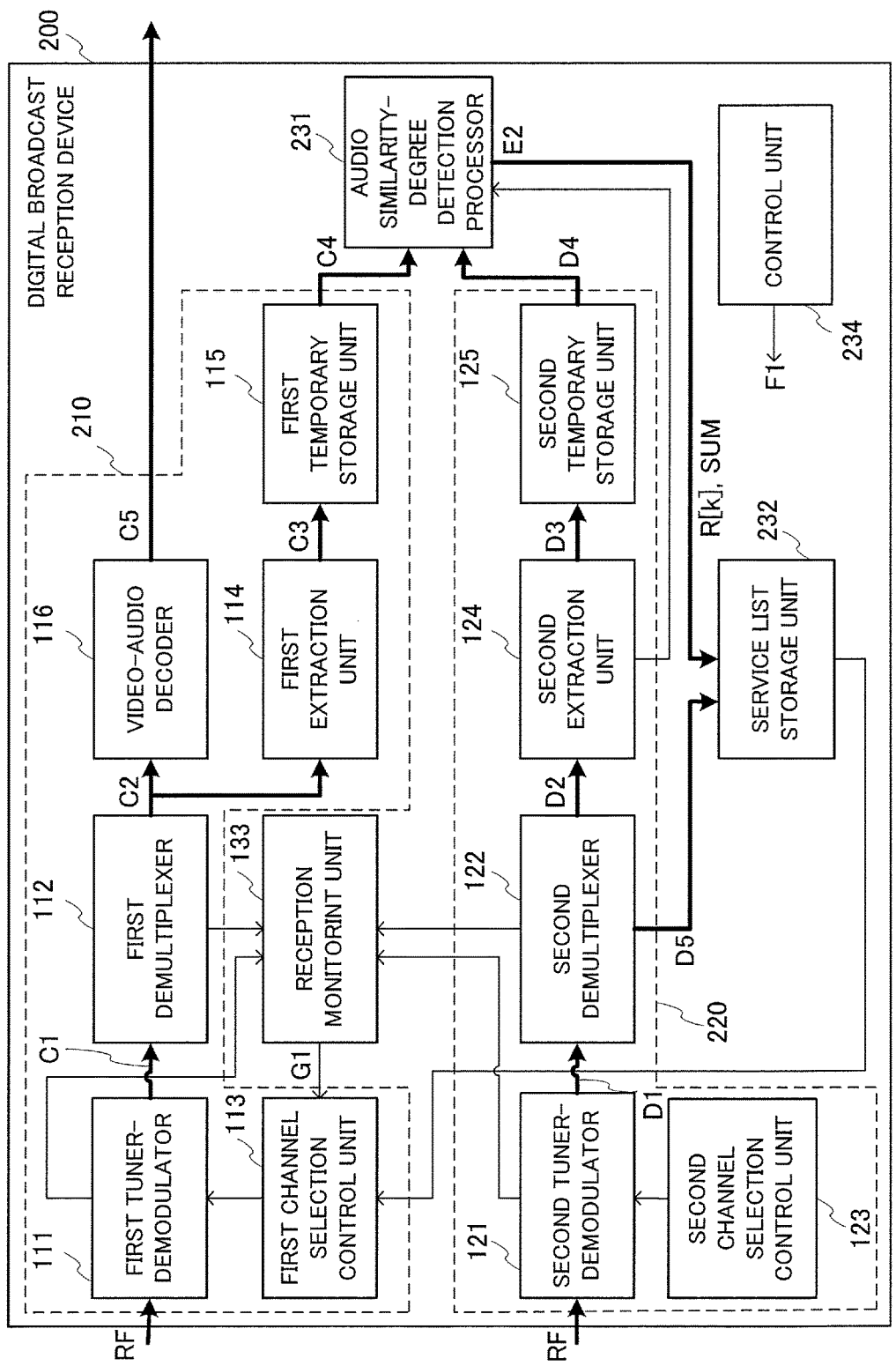
FIG. 8 is a block diagram schematically showing a configuration of a digital broadcast reception device according to a second embodiment of the present invention.

FIG. 8 is a block diagram schematically showing a configuration of a digital broadcast reception device 200 according to a second embodiment of the present invention. The digital broadcast reception device 200 is a device capable of executing a channel selection method according to the second embodiment. Components shown in FIG. 8 that are identical or correspond to components shown in FIG. 1 are assigned the same reference characters as those in FIG. 1. A first broadcast reception system 210 and a second broadcast reception system 220 shown in FIG. 8 may be configured in the same way as the first broadcast reception system 110 and the second broadcast reception system 120 shown in FIG. 1 respectively. The digital broadcast reception device 200 according to the second embodiment differs from the digital broadcast reception device 100 according to the first embodiment in the content of processes at an audio similarity-degree detection processor 231, a service list stored in a service list storage unit 232, and a control unit 234.

In a background scan process performed by the second broadcast reception system 220, all of the physical channels are successively selected in ascending or descending order of the physical channel number, for example, and it is monitored whether or not service information is updated. Through the background scan process performed by the second broadcast reception system 220, each of the physical channels is selected periodically, the audio similarity-degree value $R_{i,j}$ is calculated at every selection, and then the audio similarity-degree total value R is calculated. The audio similarity-degree value $R_{i,j}$ and the audio similarity-degree total value R are examples of a value E2 representing the audio similarity-degree. In the digital broadcast reception device 100 according to the first embodiment, the audio similarity-degree total value R stored in the service list 140 or 141 includes only the audio similarity-degree total value R obtained in one scan of all the physical channels in the background scan process performed by the second broadcast reception system 120. The digital broadcast reception device 200 according to the second embodiment differs from the difference from the digital broadcast reception device 100 according to the first embodiment in that multiple (e.g., H+1) audio similarity-degree total values R obtained by multiple times of background scan processes are stored in the service list storage unit 232 as a service list 142 and the first channel selection control unit 113 controls the first tuner-demodulator 111 on the basis of the sum total SUM of the multiple (e.g., H+1) audio similarity-degree total values R.

FIG. 9 is a diagram showing an example of the service list 142 stored in the service list storage unit 232 of the digital broadcast reception device 200 according to the second embodiment. The service list 142 is stored in the service list storage unit 232 similarly to the case of the first embodiment. In the service list 142, the audio similarity-degree total values R calculated by using the results of the multiple times of background scan processes are recorded. In the second embodiment, each of the audio similarity-degree total values R is represented as R[k] (k=0, 1, 2, . . . , H). The audio similarity-degree total value R calculated by using the result of the (k+1)-th background scan process is R[k]. The audio similarity-degree total value R calculated by using the result of the 1st background scan process is R[0], the audio similarity-degree total value R calculated by using the result of the 2nd background scan process is R[1], and the audio similarity-degree total value R calculated by using the result of the (H+1)-th background scan process is R[H]. After the (H+1)-th background scan process, k is reset to 0, the background scan process of k=0 to the background process of k=H are repeated, the audio similarity-degree total values R[0], R[1], R[H] are each updated (overwritten), and thus a ring buffer recording operation is executed. Further, the service list 142 additionally includes, as an item column of the sum of these multiple audio similarity-degree total values R[k] (k=0, 1, 2, . . . , H), an item column of the sum total SUM of the multiple audio similarity-degree total values R[0], R[1], R[H]. The sum total SUM of the multiple audio similarity-degree total values can be calculated according to the following expression (3). The sum total SUM is an example of the value E2 representing the audio similarity-degree.

$$\text{SUM} = \sum_{k=0}^{H} R[k] \tag{3}$$

Figure 10:
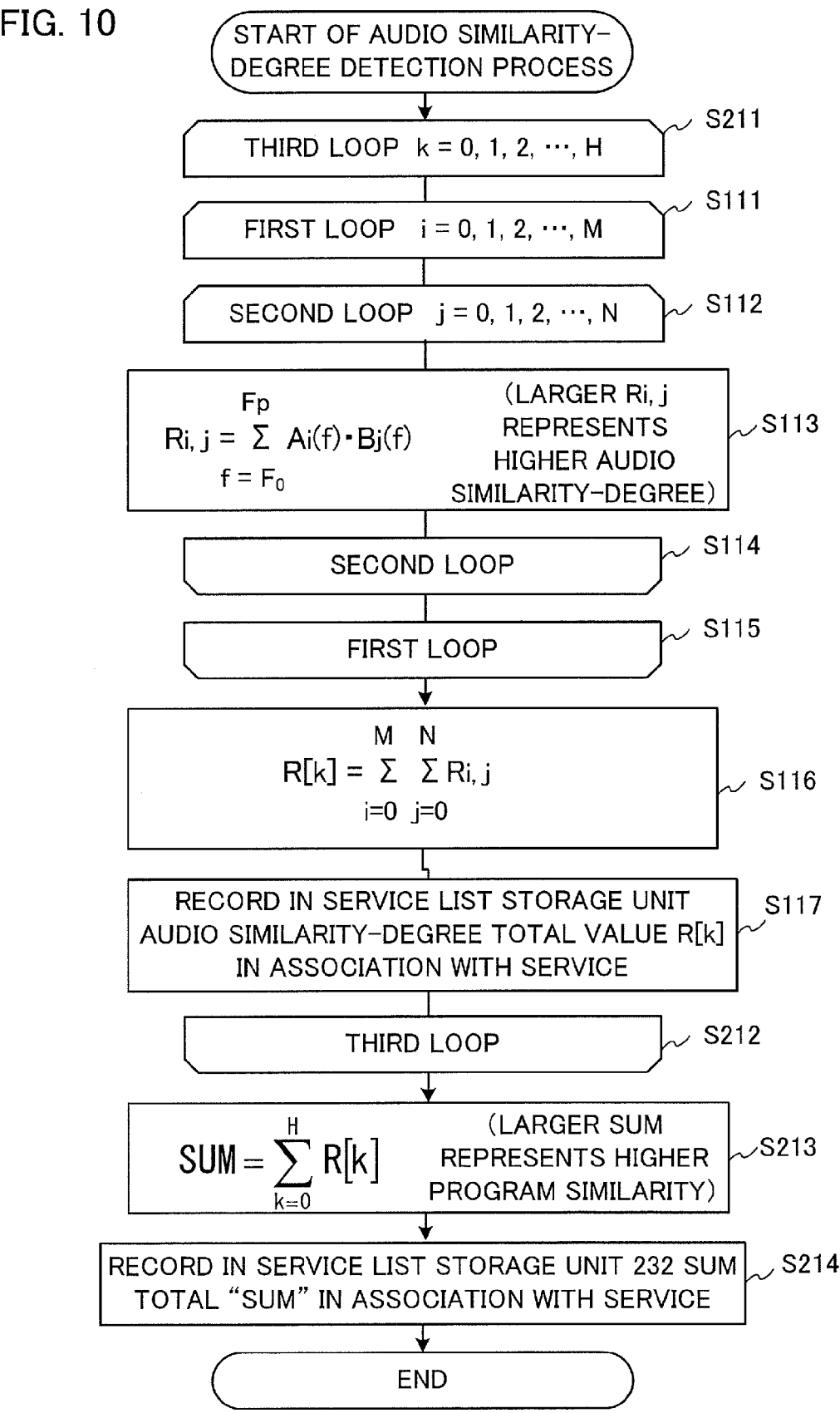
FIG. 10 is a flowchart schematically showing operation of an audio similarity-degree detection processor of the digital broadcast reception device according to the second embodiment.

FIG. 10 is a flowchart schematically showing operation of the audio similarity-degree detection processor 231 of the digital broadcast reception device 200 according to the second embodiment. Steps shown in FIG. 10 that are identical or correspond to steps shown in FIG. 4 are assigned the same reference characters as those in FIG. 4. As shown in FIG. 10, in the digital broadcast reception device 200 according to the second embodiment, a third loop is started in step S211 and processes similar to those in steps shown in FIG. 4 are executed in the third loop (between step S211 and step S212). The audio similarity-degree detection processor 231 performs the audio similarity-degree detection process in FIG. 10. In step S117 in FIG. 10, the audio similarity-degree total value R[k] is recorded in the service list storage unit 232 while associating it with a broadcast service. In this case, differently from the first embodiment, it is additionally recorded without overwriting the previous audio similarity-degree total value R. Then, the sum total SUM of the H+1 audio similarity-degree total values R is calculated (step S213) and stored in the column for the sum total of the audio similarity-degree total values in the service list 142 (step S214).

Figure 11:
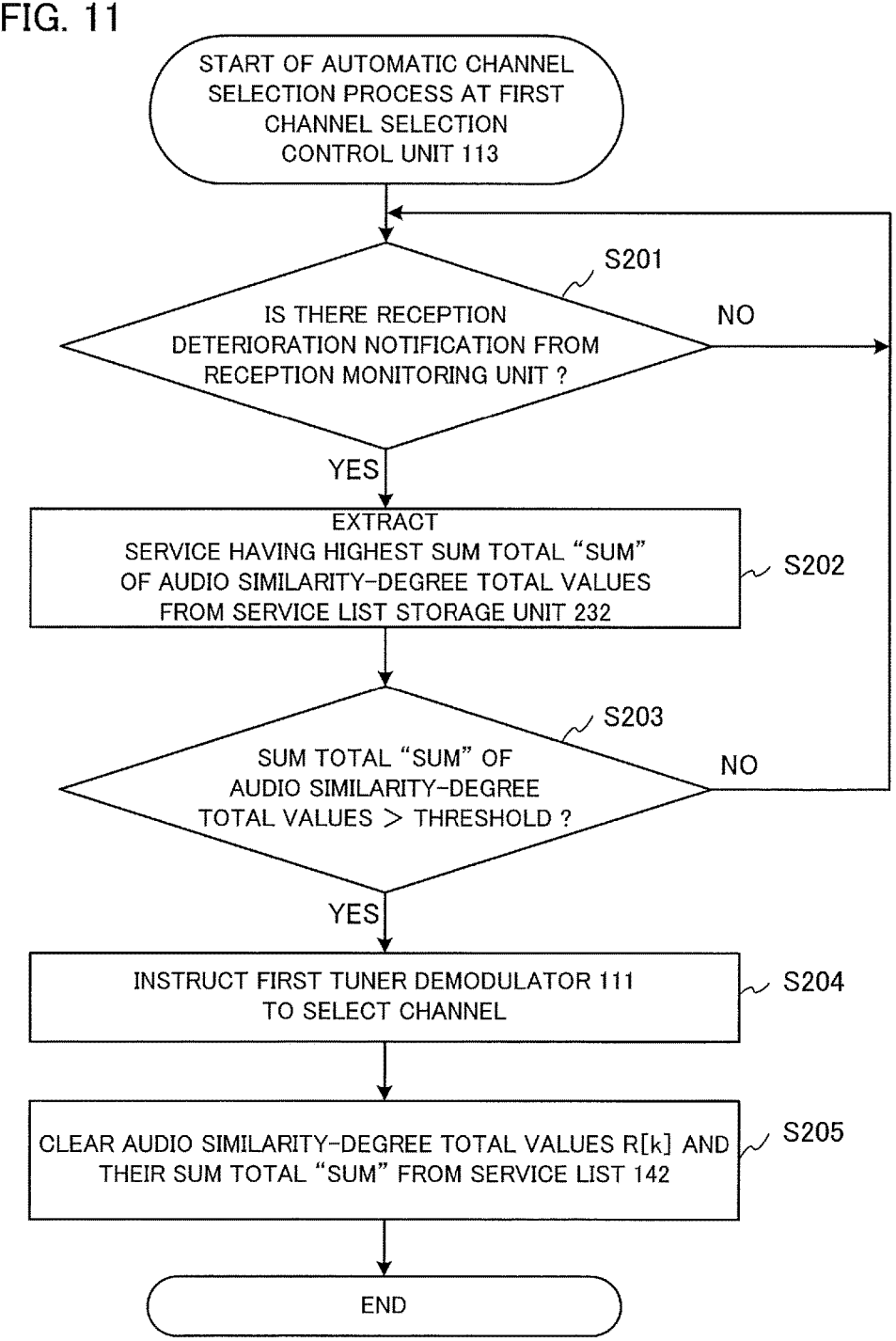
FIG. 11 is a flowchart schematically showing operation of a first channel selection control unit of the digital broadcast reception device according to the second embodiment.

FIG. 11 is a flowchart schematically showing operation of the first channel selection control unit 113 of the digital broadcast reception device 200 according to the second embodiment. As shown in FIG. 11, upon receiving from the reception monitoring unit 133 the notification signal (reception deterioration notification) G1 for notifying deterioration in the reception status (step S201), the first channel selection control unit 113 of the digital broadcast reception device 200 refers to the service list 142 in the service list storage unit 232, refers to the sum totals SUM of the audio similarity-degree total values recorded in association with the service information, and extracts a broadcast service having the highest sum total SUM of the audio similarity-degree total values (step S202). When the extracted sum total SUM of the audio similarity-degree total values is larger than a certain threshold value (e.g., predetermined threshold value) (step S203), the first channel selection control unit 113 acquires a stored physical channel number corresponding to the broadcast service from the service list 142, and instructs the first tuner-demodulator 111 to select a broadcast station (relay station) of the physical channel number (step S204). Thereafter, the audio similarity-degree total values R[k] and their sum total SUM are cleared from the service list 142 (step S205).

As described above, in the digital broadcast reception device 200 and the channel selection method according to the second embodiment, the respective audio similarity-degree total values R[k] at the multiple times of channel selection are stored in the service list 142, the sum total SUM of the audio similarity-degree total values R[k] is held therein, and when the reception status deteriorates, the first channel selection control unit 113 refers to the sum total SUM and automatically selects a broadcast service having the highest audio similarity-degree (i.e., which is most similar in sound). Therefore, even in a case where programs are different from each other and they contain scenes with high audio similarity-degree for certain several seconds, multiple audio similarity-degree total values R[k] are used as evaluation targets and thus erroneous detection of an identical program can be reduced.

For example, in a case where a silent scene of several seconds exists in each of different programs, previous H audio similarity-degree total values R[k] are referred and thus the risk that they are erroneously judged to be identical programs can be reduced.

Further, even in identical programs, there are cases where different pieces of region-dependent content are broadcast only in the CM periods. In such cases, in the first embodiment, the judgment that they are identical programs based on the evaluation of the CM periods cannot be made. In contrast, the digital broadcast reception device 200 according to the second embodiment refers to the H+1 audio similarity-degree total values R[k], and thus the judgment that they are identical programs is possible even between programs containing different CM broadcasts. As above, according to the second embodiment, there is an effect that erroneous detection in the identical program judgment can be reduced and the reliability of the detection results can be increased.

Third Embodiment

Figure 12:
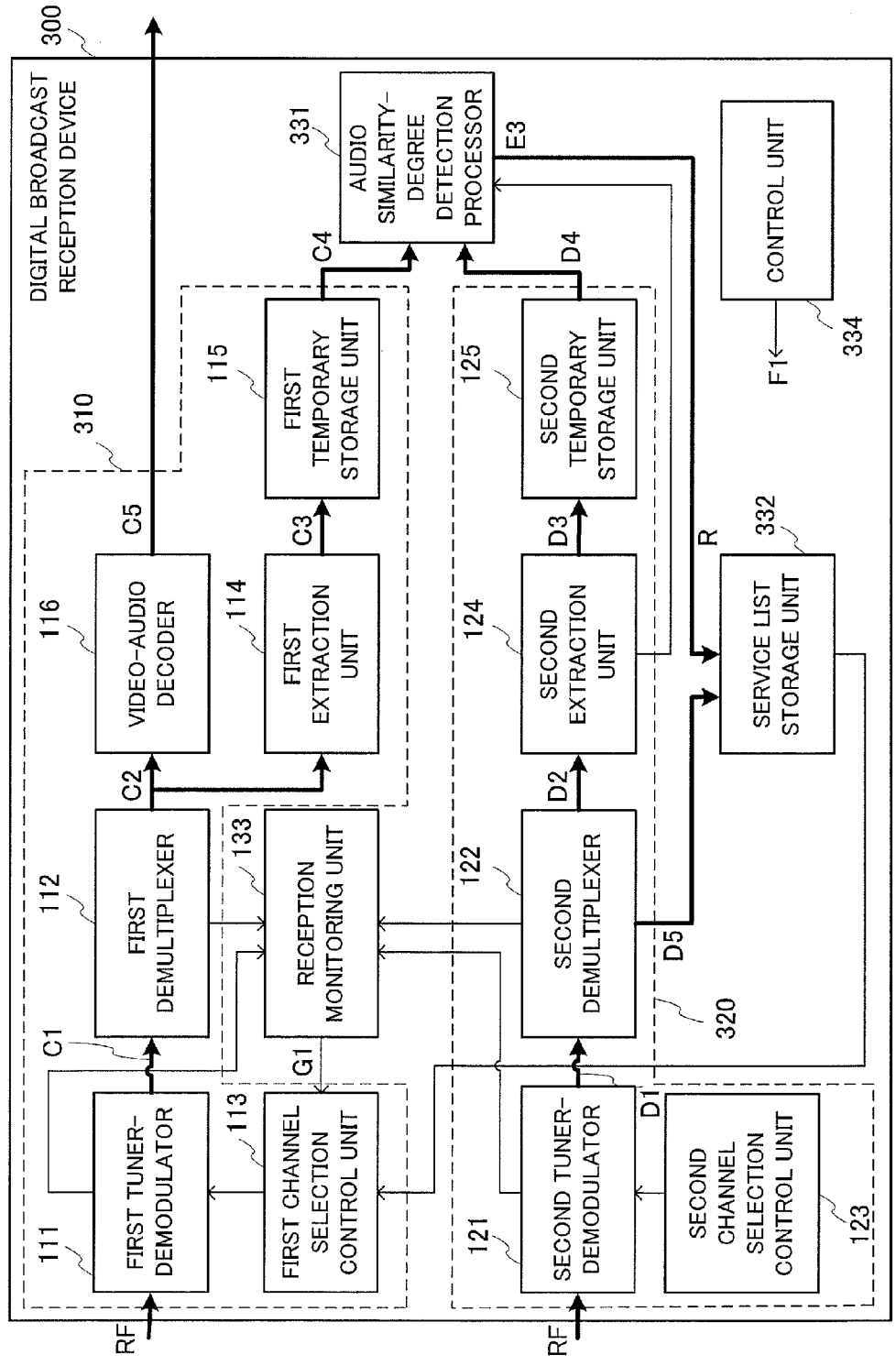
FIG. 12 is a block diagram schematically showing a configuration of a digital broadcast reception device according to a third embodiment of the present invention.

FIG. 12 is a block diagram schematically showing a configuration of a digital broadcast reception device 300 according to a third embodiment of the present invention. The digital broadcast reception device 300 is a device capable of executing a channel selection method according to the third embodiment. Components shown in FIG. 12 that are identical or correspond to components shown in FIG. 1 are assigned the same reference characters as those in FIG. 1. A first broadcast reception system 310 and a second broadcast reception system 320 shown in FIG. 12 may be configured in the same way as the first broadcast reception system 110 and the second broadcast reception system 120 in FIG. 1, respectively. The digital broadcast reception device 300 according to the third embodiment differs from the digital broadcast reception device 100 according to the first embodiment in processing performed by an audio similarity-degree detection processor 331, a service list stored in a service list storage unit 332, and a control unit 334.

Figure 13:
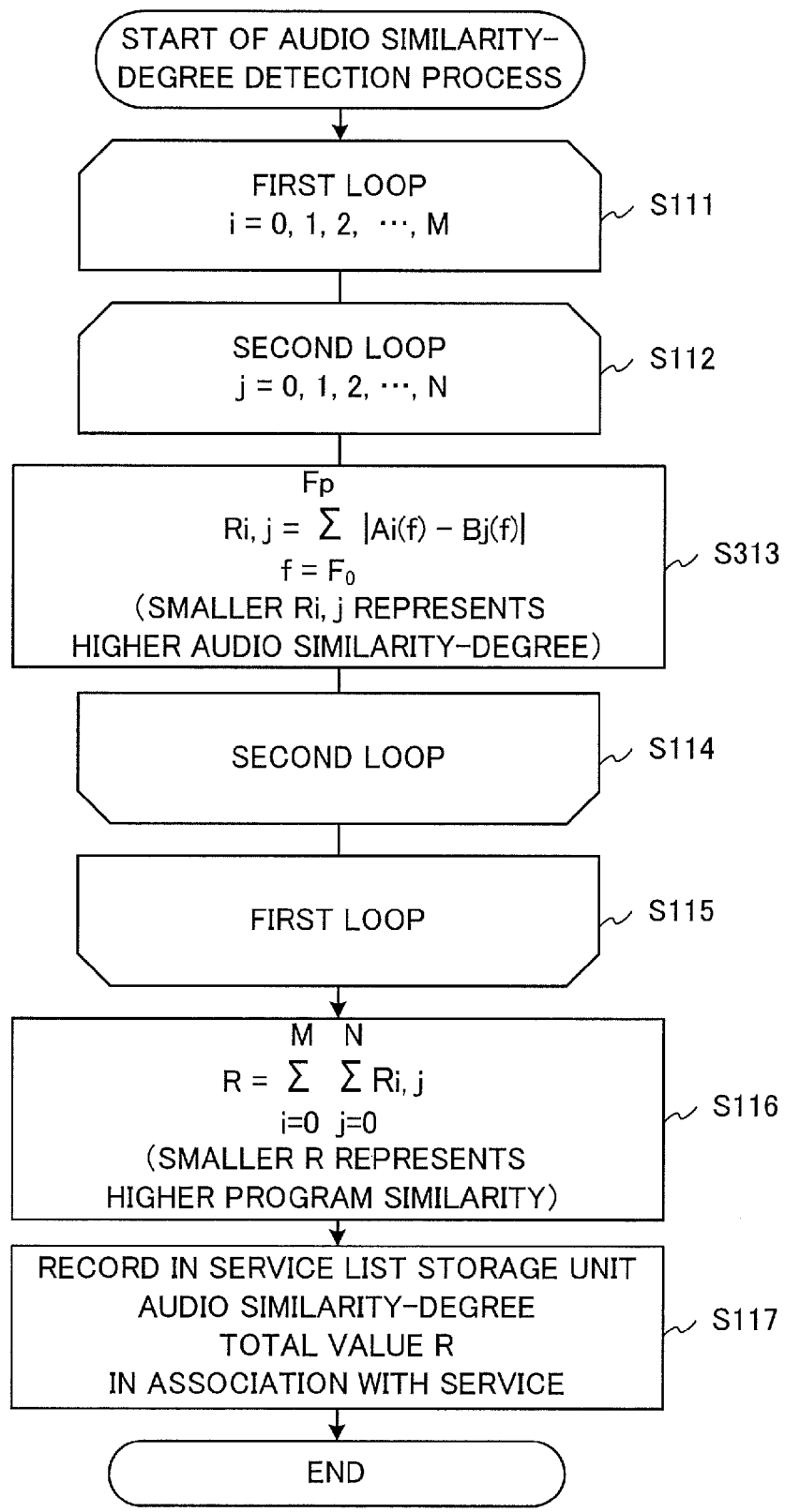
FIG. 13 is a flowchart schematically showing operation of an audio similarity-degree detection processor of the digital broadcast reception device according to the third embodiment.

FIG. 13 is a flowchart schematically showing operation of the audio similarity-degree detection processor 331 of the digital broadcast reception device 300 according to the third embodiment. Steps shown in FIG. 13 that are identical or correspond to steps shown in FIG. 4 are assigned the same reference characters as those in FIG. 4. As shown in FIG. 13, the digital broadcast reception device 300 according to the third embodiment differs from the digital broadcast reception device 100 according to the first embodiment in that the calculation in step S313 is performed according to the following expression (4).

$$R_{i,j} = \sum_{f=F0}^{Fp} |A_i(f) - B_j(f)| \quad (4)$$

where F0 and Fp are the minimum value and the maximum value of the frequency f used in the calculation of the expression (4) respectively. A predetermined number of frequencies from the minimum value F0 to the maximum value Fp are used as the frequency f in the expression (4). The predetermined number is eight (the number of arrows) in $A_i(f)$ (i=0, 1, 2, . . . , M) and $B_j(f)$ (j=0, 1, 2, . . . , N) in FIGS. 14(a) to 14(d) which will be described later.

The calculation of the expression (4) in step S313 will be described below. An absolute value of the difference between the i-th piece of first audio spectrum information $A_i(f)$ stored in the first temporary storage unit 115 and the j-th piece of second audio spectrum information $B_j(f)$ stored in the second temporary storage unit 125 is calculated in regard to a certain frequency f. This calculation is performed for all the frequency components (eight frequency components in FIGS. 14(a) to 14(d)) and the sum total of the calculation results is obtained as the audio similarity-degree value $R_{i,j}$ regarding certain i and j. Incidentally, even if the programs are identical programs, the absolute values of pieces of the audio spectrum information can be different from each other in cases where their sound levels are different from each other or the programs are broadcast by use of different audio encoding methods. On the supposition of such cases, it is also possible to use normalized audio spectrum information, obtained by dividing the audio spectrum information at each frequency by the total power value obtained by the summation, as the first audio spectrum information $A_i(f)$ and the second audio spectrum information $B_j(f)$.

Figure 14A:
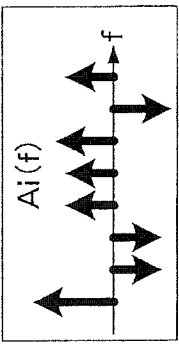
Figure 14B:
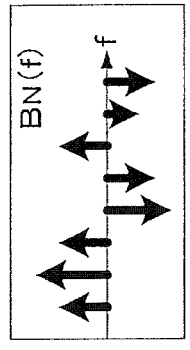
Figure 14C:
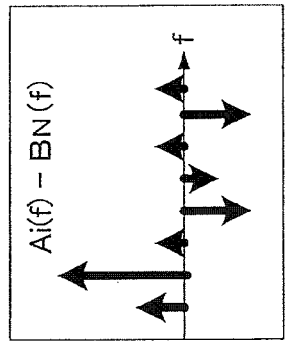

FIGS. 14(a) to 14(d) are diagrams for explaining detection operation of audio similarity-degrees between first audio spectrum information and second audio spectrum information in the audio similarity-degree detection processor 331 of the digital broadcast reception device 300 according to the third embodiment. In FIG. 14, the first audio spectrum information $A_i(f)$ and the second audio spectrum information $B_j(f)$ are indicated while setting their average values at the zero level. FIG. 14(a) shows power values of respective frequency components with regard to a certain i-th piece of the first audio spectrum information $A_i(f)$ among the first audio spectrum information A(f) on the currently viewed/listened program and the horizontal axis represents frequency therein. FIG. 14(b) shows the second audio spectrum information B(f) on a certain program detected by the channel selection in the background scan process executed by the second broadcast reception system 320, and shows, in the leftmost column, power values of respective frequency components of the first (0-th) piece $B_0(f)$ extracted from the information. FIG. 14(c) shows values each obtained as the difference between frequency components of $A_i(f)$ and $B_0(f)$ at the same frequency in the calculation in step S313. FIG. 14(d) shows the value obtained by adding the frequency components of the absolute values $|A_i(f)-B_0(f)|$ of the differences $(A_i(f)-B_0(f))$ obtained in FIG. 14(c) with regard to all the frequencies.

Similarly, the second column from the left in FIGS. 14(a) to 14(d) shows the result of a similar calculation in step S313 with regard to the i-th piece of first audio spectrum information $A_i(f)$ stored in the first temporary storage unit 115 and the 1st piece of second audio spectrum information $B_1(f)$ stored in the second temporary storage unit 125.

FIGS. 14(a) to 14(d) shows the process of performing the calculation of step S313 in regard to all the pieces of second audio spectrum information $B_j(f)$ stored in the second temporary storage unit 125 as mentioned above. The 2nd column from the left in FIGS. 14(a) to 14(d) shows a case where the first audio spectrum information $A_i(f)$ and the second audio spectrum information $B_1(f)$ totally coincide with each other. In this case, the value in FIG. 14(d) becomes substantially 0 as the minimum values. In contrast, when the first audio spectrum information $A_i(f)$ and the second audio spectrum information $B_1(f)$ are of programs not identical with each other, the result shown in FIG. 14(d) takes on a large value. When the same scene as a certain scene of the currently viewed/listened program exists in the second temporary storage unit 125, the value of FIG. 14(d) becomes remarkably small as in this example. As described above, the detection of an identical program can be conducted by performing the calculation in step S313.

The audio similarity-degree total value R of all the audio similarity-degree values $R_{i,j}$ is calculated in step S116. When the program being judged is truly an identical program, the audio similarity-degree becomes high in a plurality of scenes and thus the audio similarity-degree total value R is obtained as a small value. According to the third embodiment, there is an effect of preventing erroneous judgment misjudging a different program as an identical program just because the audio similarity-degree is accidentally high in a particular scene (in the third embodiment, an audio similarity-degree value R was lower than a predetermined threshold value).

Further, according to the third embodiment, unlike the first embodiment, among identical programs, the audio similarity-degree total value R has a tendency to be smaller when the delay difference between programs is small in comparison with the case where the delay difference is large. Therefore, there is an effect that by having the first channel selection control unit 113 select a small audio similarity-degree total value R in the selection of the channel to be selected as the identical program (the destination of channel selection), the currently viewed/listened program can be automatically switched to a program having less delay, and the feeling of strangeness to the viewer/listener can be reduced. The audio similarity-degree total value R is an example of a value E3 representing the audio similarity-degree.

Furthermore, the sum-of-differences calculation in step S313 includes subtraction and addition only. Compared with the sum-of-products calculation in step S113 (FIG. 4) in the first embodiment, there is an effect that the sum-of-differences calculation (step S313) is of a lower computation load and can be implemented by software on the microprocessor only, without needing calculation hardware or a DSP (Digital Signal Processor).

Fourth Embodiment

Figure 15:
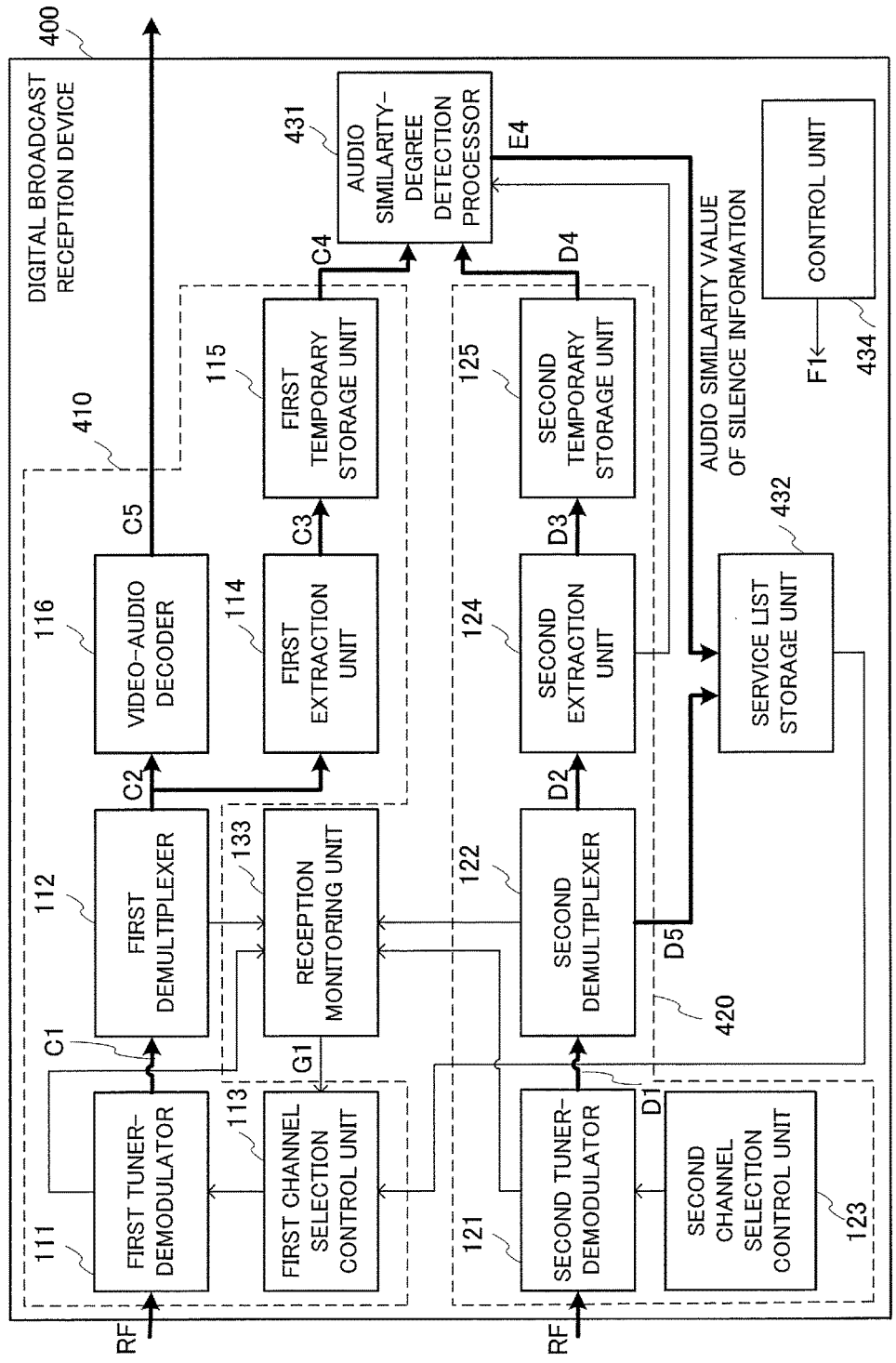
FIG. 15 is a block diagram schematically showing a configuration of a digital broadcast reception device according to a fourth embodiment of the present invention.

FIG. 15 is a block diagram schematically showing a configuration of a digital broadcast reception device 400 according to a fourth embodiment of the present invention. The digital broadcast reception device 400 is a device capable of executing a channel selection method according to the fourth embodiment. Components shown in FIG. 15 that are identical or correspond to components shown in FIG. 1 are assigned the same reference characters as those in FIG. 1. A first broadcast reception system 410 and a second broadcast reception system 420 shown in FIG. 15 may be configured in the same way as the first broadcast reception system 110 and the second broadcast reception system 120 in FIG. 1, respectively. The digital broadcast reception device 400 according to the fourth embodiment differs from the digital broadcast reception device 100 according to the first embodiment in processing performed by an audio similarity-degree detection processor 431, a service list stored in a service list storage unit 432, and a control unit 434.

Figure 16:
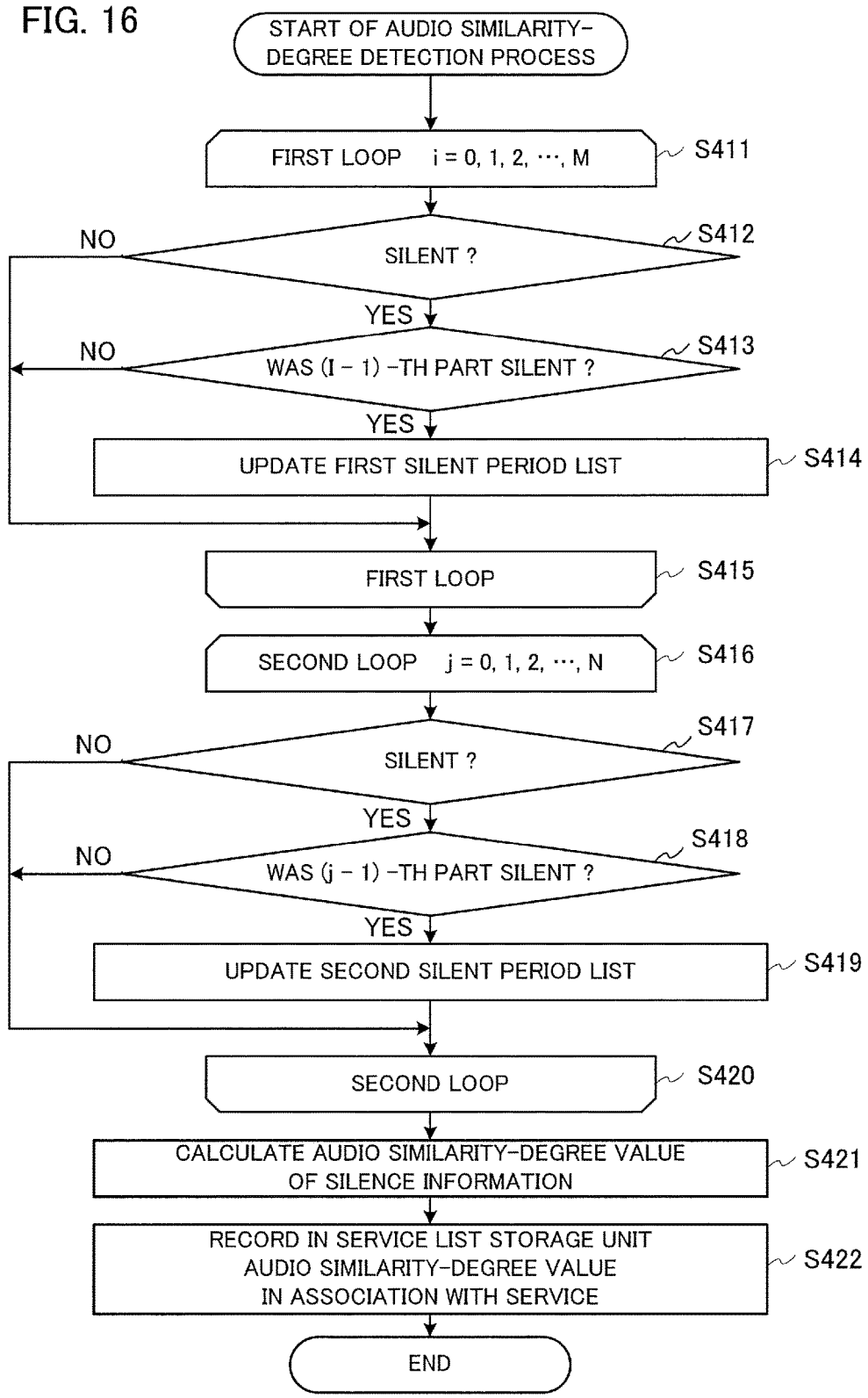
FIG. 16 is a flowchart schematically showing operation of an audio similarity-degree detection processor of the digital broadcast reception device according to the fourth embodiment.

FIG. 16 is a flowchart schematically showing operation of the audio similarity-degree detection processor 431 of the digital broadcast reception device 400 according to the fourth embodiment. In the audio similarity-degree detection processes executed by the audio similarity-degree detection processor 131, 231 and 331 in the first through third embodiments, the audio similarity-degree value $R_{i,j}$ between the first audio spectrum information and the second audio spectrum information is calculated by adding up the audio similarity-degree values $R_{i,j}$ of the audio spectrum information at each frequency f across all the frequencies (in FIGS. 5(a) to 5(d) and FIGS. 14(a) to 14(d), audio similarity-degree values regarding eight frequencies) as shown in step S113 in FIG. 4 and step S313 in FIG. 13. However, the audio similarity-degree values $R_{i,j}$ may be determined based on occurrence intervals of silent parts and feature detection of silent periods. The digital broadcast reception device 400 according to the fourth embodiment differs from the digital broadcast reception devices 100, 200 and 300 according to the first through third embodiments in that the audio similarity-degree detection process by the audio similarity-degree detection processor 431 is executed by the feature detection of silent parts as shown in FIG. 16.

For example, the audio similarity-degree detection processor 431 successively executes, for each of first audio spectrum information parts, a process in which the i-th (i is an integer of 0 or more) first audio spectrum information part out of the first audio spectrum information stored in the first temporary storage unit 115 is extracted, a first power value obtained from addition of respective frequency components of the i-th first audio spectrum information part $A_i(f)$ for all the frequencies, and if the first power value is lower than a certain silence threshold value, the extracted first audio spectrum information part is judged as a first silent part. Meanwhile, the audio similarity-degree detection processor 431 successively executes, for each of second audio spectrum information parts, a process in which the j-th (j is an integer of 0 or more) second audio spectrum information part out of the second audio spectrum information stored in the second temporary storage unit 125 is extracted, a second power value obtained from addition of respective frequency components of the j-th second audio spectrum information part $B_j(f)$ for all the frequencies, and if the second power value is lower than a certain silence threshold value, the extracted second audio spectrum information part is judged as a second silent part. Then, the audio similarity-degree detection processor 431 determines a value indicating the audio similarity-degree, from a first time interval between a first silent period which is a period of the first silent part and a next first silent period, a first silence duration period containing a plurality of the consecutive first silent periods, a second time interval between a second silent period which is a period of the second silent part and a next second silent period, and a second silence duration period containing a plurality of the consecutive second silent periods.

The audio similarity-degree detection processor 431 according the fourth embodiment extracts the i-th (i=0, 1, 2, . . . , M) first audio spectrum information part $A_i(f)$ from the first audio spectrum information stored in the first temporary storage unit 115 in step S411 in FIG. 16, and carries out the detection of a silent part (first silent part) in step S412. The audio similarity-degree detection processor 431 calculates the power value as the sum of frequency components of the i-th first audio spectrum information part $A_i(f)$ across all the frequencies, and judges the i-th first audio spectrum information part $A_i(f)$ as silence (silent part) if the calculated power value is smaller than a certain silence threshold value (e.g., a preset threshold value). When it is judged as a silent part, the audio similarity-degree detection processor 431 checks whether the previous, i.e., (i−1)-th audio data was a silent part or not in step S413. When it was silent, the audio similarity-degree detection processor 431 updates a first silent period list held by the audio similarity-degree detection processor 431, by adding a silent period to the first silent period list in step S414. Here, the first silent period list is a table-like information on multiple silent periods that is made by collecting multiple silent periods each of which is represented by i (integer from 0 to M) at the start of the silent period (first silent period) and the silence duration period (first silence duration period). When judging it not to be silent in step S412, the audio similarity-degree detection processor 431 judges that the silent period has ended. As above, by the processing of steps S411 to S415, the audio similarity-degree detection processor 431 accumulates the silence duration periods and the silence occurrence intervals (first time intervals) regarding all the audio spectrum information stored in the first temporary storage unit 115 as the first silent period list.

Similarly, by the processing of steps S416 to S420, the audio similarity-degree detection processor 431 accumulates the silence duration periods (second silence duration periods) and the silence occurrence intervals (second time intervals) regarding all the audio spectrum information stored in the second temporary storage unit 125 as a second silent period list.

Subsequently, the audio similarity-degree detection processor 431 calculates an audio similarity-degree value of silence information between the first silent period list and the second silent period list in step S421. For example, the audio similarity-degree value can be obtained by expressing each of the first and second silent period lists by a sequence of numbers, in which silent is represented by 0 and non-silent is represented by 1, arranged in a time series, calculating a correlation between the sequences, and using the correlation value as the audio similarity-degree value. However, the calculation of the audio similarity-degree value may be performed differently.

Subsequently, the audio similarity-degree detection processor 431 stores the audio similarity-degree value of silence information which is obtained in step S421 in the audio similarity-degree total value R in the service list 140 (FIG. 2(a)) or the audio similarity-degree total values R and the sum total SUM in the service list 142 (FIG. 9) in the service list storage unit 432 in step S422.

Operations and effects of the fourth embodiment other than those descried above are equivalent to those in the first and second embodiments.

As described above, by the digital broadcast reception device 400 and the channel selection method according to the fourth embodiment, the audio similarity-degree value is detected from the similarity-degree of the silence duration periods and the silence occurrence intervals between program sounds, and it is used as program similarity-degree. Therefore, there is an effect that reliability of the identical program detection in programs including a lot of silent scenes can be increased.

Fifth Embodiment

Figure 17:
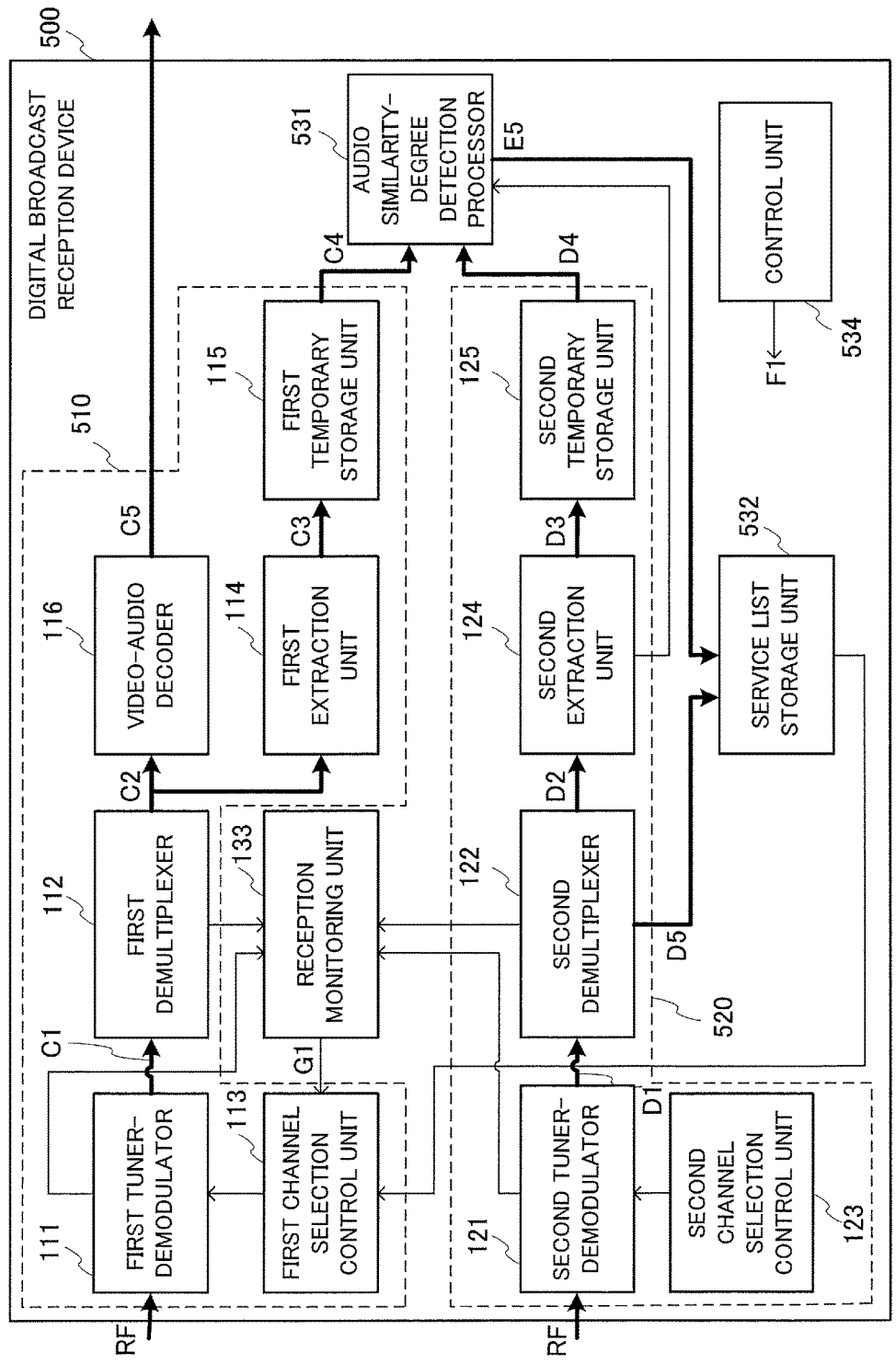
FIG. 17 is a block diagram schematically showing a configuration of a digital broadcast reception device according to a fifth embodiment of the present invention.

FIG. 17 is a block diagram schematically showing a configuration of a digital broadcast reception device 500 according to a fifth embodiment of the present invention. The digital broadcast reception device 500 is a device capable of executing a channel selection method according to the fifth embodiment. Components shown in FIG. 17 that are identical or correspond to components shown in FIG. 1 are assigned the same reference characters as those in FIG. 1. A first broadcast reception system 510 and a second broadcast reception system 520 shown in FIG. 17 may be configured in the same way as the first broadcast reception system 110 and the second broadcast reception system 120 in FIG. 1, respectively.

In the above first through fourth embodiments, the audio similarity-degree detection processor 131, 231, 331 and 431 perform the audio similarity-degree detection process by searching the first temporary storage unit 115 and the second temporary storage unit 125 successively from the oldest piece of audio spectrum information, for example, and the pieces of audio spectrum information having high audio similarity-degree are detected later. However, in order to make it possible to carry out the identical program judgment in the several seconds of channel selection in the background scan process performed by the second broadcast reception system, it is desirable to shorten the processing time. Therefore, the digital broadcast reception device 500 according to the fifth embodiment executes the following process without employing the method searching through all the pieces of second audio spectrum information in the second temporary storage unit 125 in regard to every piece of first audio spectrum information in the first temporary storage unit 115. First, in regard to a piece of first audio spectrum information whose order of storage in the first temporary storage unit 115 among the multiple pieces of first audio spectrum information in the first temporary storage unit 115 is at the center (around the center), the search of the second audio spectrum information in the second temporary storage unit 125 is made. The search is interrupted at the point when a piece of audio spectrum information having an audio similarity-degree value higher than a threshold value is detected successfully. For the detected piece of audio spectrum information, the position of extraction of the first audio spectrum information in the first temporary storage unit 115 to be used for the next audio similarity-degree evaluation is determined based on relative positional relationship between the order of storage in the second temporary storage unit 125 and the order of storage in the first temporary storage unit 115, and then the second audio similarity-degree evaluation is conducted. At the point when the third audio similarity-degree evaluation is completed according to the above procedure, if the audio similarity-degree value exceeded the threshold value in all the three evaluations, the broadcast service currently selected by the second broadcast reception system 520 is judged as a broadcast service performing the same program as the broadcast service currently viewed/listened to on the first broadcast reception system 510, and is stored as a part of the service list in a service list storage unit 532.

FIG. 18 is a diagram for explaining detection operation of audio similarity-degrees between first audio spectrum information and second audio spectrum information (operation in a case where the second audio spectrum information is stored at a time earlier than the first audio spectrum information) in an audio similarity-degree detection processor of the digital broadcast reception device according to the fifth embodiment. FIG. 19 is a diagram for explaining detection operation of audio similarity-degrees between the first audio spectrum information and the second audio spectrum information (operation in a case where the second audio spectrum information is stored at a time later than the first audio spectrum information) in the audio similarity-degree detection processor of the digital broadcast reception device according to the fifth embodiment. FIG. 20 is a flowchart schematically showing operation of the audio similarity-degree detection processor 531 of the digital broadcast reception device 500 according to the fifth embodiment. The following explanation will be given of cases where the number of pieces of data of the audio spectrum information stored in each of the first and second temporary storage units 115 and 125 is 4N (N is a positive integer). FIG. 18 shows a case where the audio spectrum information stored in the first temporary storage unit 115 and the audio spectrum information stored in the second temporary storage unit 125 are audio spectrum information on identical programs. As shown in FIG. 18, a certain delay difference (inter-program delay difference) in the storage time has occurred between the two programs since there is a delay difference between the two programs and the audio spectrum information in the second temporary storage unit 125 was transmitted earlier in time. Further, FIG. 19 shows a case where the audio spectrum information stored in the first temporary storage unit 115 and the audio spectrum information stored in the second temporary storage unit 125 are audio spectrum information on identical programs. As shown in FIG. 19, a certain delay difference (inter-program delay difference) in the storage time has occurred between the two programs since there is a delay difference between the two programs and the audio spectrum information in the second temporary storage unit 125 was transmitted later in time.

Next, the processing performed by the audio similarity-degree detection processor 531 will be described below. As shown in FIG. 20, the audio similarity-degree detection processor 531 first extracts the 2N-th (i=2N) piece of first audio spectrum information $A_i(f)$ from the first temporary storage unit 115 (steps S511 and S512). Subsequently, the audio similarity-degree detection processor 531 searches the second temporary storage unit 125 for second audio spectrum information corresponding to the 2N-th (i=2N) piece of first audio spectrum information $A_i(f)$. This processing is the loop process of steps S513 to S516 in FIG. 20. The process of step S514 in these steps is the same as the audio similarity-degree calculation process described in the third embodiment. Alternatively, the process of step S514 may be the process of step S113 in the audio similarity-degree calculation process described in the first embodiment. Alternatively, the process of step S514 may be the process described in the fourth embodiment, that is, the process using the audio power value obtained from sum of the respective frequency components of the audio spectrum information for all the frequencies and judging a piece of audio spectrum information whose audio power value is close as similar audio spectrum information.

In step S515, whether the audio similarity-degree value $R_{i,j}$ calculated in step S514 is larger than a predetermined threshold value or not is judged. If the audio similarity-degree value $R_{i,j}$ is smaller than the threshold value, the process advances to step S516 and returns to the start of the loop. The next piece of second audio spectrum information is extracted from the second temporary storage unit 125 in step S513 and then the audio similarity-degree judgment is repeated. If the audio similarity-degree value $R_{i,j}$ is larger than the threshold value in step S515, the process advances to step S517. This state is indicated by P51 in FIG. 18 and FIG. 19. That is, as the result of the search of the second temporary storage unit 125 made by the audio similarity-degree detection processor 531 in regard to the 2N-th piece of audio spectrum information included in the audio spectrum information in the first temporary storage unit 115 shown in FIG. 18 and FIG. 19, the audio similarity-degree value $R_{i,j}$ with the F-th (F is a positive integer) piece of audio spectrum information (audio similarity-degree value $R_{2N,F}$) shown in FIG. 18 and FIG. 19 was higher than the predetermined threshold value (P52 in FIG. 18 and FIG. 19). In this case, the storage position of the detected audio spectrum information (j=F) is earlier in time than the storage position of the audio spectrum information extracted from the first temporary storage unit 115 (i=2N), that is, i>j holds. In this case, the judgment in step S517 in FIG. 20 is YES, i is updated to i=i+N=3N in step S518, the process returns to step S512, and the 3N-th (i=3N) piece of first audio spectrum information $A_i(f)$ is newly extracted from the first temporary storage unit 115 for the next audio similarity-degree calculation (P54 in FIG. 18). Then, the audio similarity-degree detection processor 531 performs the audio similarity-degree evaluation in steps S513 to S515. If the audio similarity-degree value $R_{i,j}$ exceeds the threshold value in step S515 (P55 in FIG. 18), the process advances to step S517. Since i=3N and j=F+N in step S517, the judgment on whether i>j or not is YES, i is updated to i=i+N=4N in step S518, the process returns to step S512, and the 4N-th (i=4N) piece of first audio spectrum information $A_i(f)$ is extracted from the first temporary storage unit 115 for the next audio similarity-degree calculation (P56 in FIG. 18). Thereafter, the audio similarity-degree detection processor 531 performs the audio similarity-degree calculation in the same way. The reference character P57 in FIG. 18 indicates that the audio similarity-degree of the (F+2N)-th piece of audio spectrum information exceeded the threshold value (step S515). The judgment in step S515 is YES, the judgment in step S517 is YES, and i is updated to i=5N in step S518. Therefore, the judgment in step S520 turns YES, and then in step S521, the fact that the currently viewed/listened broadcast service and the broadcast service currently selected by the background scan process in the second broadcast reception system 520 are broadcast services performing programs identical with each other is recorded in the service list storage unit 532 (P58 in FIG. 18).

In cases where the audio spectrum information stored in the second temporary storage unit 125 was transmitted later in time than the audio spectrum information stored in the first temporary storage unit 115 as shown in FIG. 19, the judgment in step S517 in FIG. 20 is NO. As indicated by P51, P54 and P56 in FIG. 19, the 2N-th piece (P51 in FIG. 19), the N-th piece (P54 in FIG. 19) and the 0-th piece (P56 in FIG. 19) are successively selected by step S519 from the first temporary storage unit 115 as evaluation target audio spectrum information, and the audio similarity-degree evaluation is performed on these three pieces of evaluation data. Then, if any of the audio similarity-degrees exceeds the threshold value (step S515), the fact that the currently viewed/listened broadcast service and the broadcast service currently selected by the background scan process in the second broadcast reception system 520 are broadcast services performing programs identical with each other is recorded in the service list storage unit 532 (P58 in FIG. 19) in step S521.

As described above, in the digital broadcast reception device 500 and the channel selection method according to the fifth embodiment, the evaluation of the similarity with the audio spectrum information currently received in the second broadcast reception system 520 is made possible by using only three pieces of first audio spectrum information, without using all the pieces of first audio spectrum information stored in the first temporary storage unit 115. Thus, there is an effect that the time necessary for the identical program detection can be shortened. Since the period for which the channel selected by the background scan process in the second broadcast reception system 520 is maintained is as short as several seconds, the above effect is effective for implementing the identical program detection in the period.

Further, the second audio spectrum information in the second temporary storage unit 125 is searched first for similar audio spectrum information that is similar to a piece of audio spectrum information whose storage position in the first temporary storage unit 115 is approximately the center, and the position of extraction of the audio spectrum information in the first temporary storage unit 115 as the next evaluation target is properly determined based on the relative positional relationship between storage positions in regard to the detected similar audio spectrum information. Therefore, there is an effect that identical programs can be detected efficiently and the identical program detection time can be shortened. Since the period for which the channel selected by the background scan process is maintained in the second broadcast reception system 520 is as short as several seconds, the above effect is effective for implementing the identical program detection in the period.

INDUSTRIAL APPLICABILITY

The present invention is applicable to television broadcast receivers, radio broadcast receivers, personal computers and mobile terminal devices with a function of receiving a television broadcast or a radio broadcast, broadcast receivers mounted on mobile objects such as motor vehicles and trains, and the like.

DESCRIPTION OF REFERENCE CHARACTERS 100, 200, 300, 400, 500 digital broadcast reception device; 110, 210, 310, 410, 510 first broadcast reception system; 111 first tuner-demodulator; 112 first demultiplexer; 113 first channel selection control unit; 114 first extraction unit; 115 first temporary storage unit; 116 video-audio decoder; 120, 220, 320, 420, 520 second broadcast reception system; 121 second tuner-demodulator; 122 second demultiplexer; 123 second channel selection control unit; 124 second extraction unit; 125 second temporary storage unit; 131, 231, 331, 431, 531 audio similarity-degree detection processor; 132, 232, 332, 432, 532 service list storage unit; 133 reception monitoring unit; 134, 234, 334, 434, 534 control unit; 140, 141, 142 service list; C4 first audio spectrum information; D4 second audio spectrum information; E1, E2, E3, E4, E5 value representing audio similarity-degree; $R_{i,j}$ audio similarity-degree value; R, R[k] total value of multiple audio similarity-degree values (audio similarity-degree total value); SUM sum total of multiple audio similarity-degree total values; G1 notification signal; F1 control signal; RF broadcast wave.

What is claimed is:

1. A digital broadcast reception device comprising:
a first digital broadcast reception system that includes a first temporary storage unit, selects a channel of a digital broadcast wave, extracts first audio spectrum information from a first coded stream of the selected channel, and stores the extracted first audio spectrum information in the first temporary storage unit, wherein multiple pieces of the first audio spectrum information are extracted from different points of time in the first coded stream;
a second digital broadcast reception system that includes a second temporary storage unit, successively selects channels of digital broadcast waves, successively extracts second audio spectrum information from second coded streams of the selected channels, and successively stores the extracted second audio spectrum information in the second temporary storage unit, wherein multiple pieces of the second audio spectrum information are extracted from different points of time in each second coded stream;
an audio similarity-degree detection processor that successively generates values representing audio similarity-degrees between a first program containing the first audio spectrum information and a second program containing the second audio spectrum information extracted from a corresponding second coded stream, from the first audio spectrum information stored in the first temporary storage unit and the second audio spectrum information successively stored in the second temporary storage unit, wherein a subset of the values representing the audio similarity-degrees represent a similarity between respective pieces of the first audio spectrum information and the second audio spectrum information that correspond to different points in time in connection with the first coded stream and the corresponding second coded stream, respectively;
a service list storage unit that stores a service list including information associating attached information extracted by the second digital broadcast reception system and the values representing the audio similarity-degrees successively generated by the audio similarity-degree detection processor with each other; and
a reception monitoring unit that sends a notification signal representing deterioration of reception status to the first digital broadcast reception system when a value representing the reception status of the digital broadcast wave of the channel currently selected by the first digital broadcast reception system becomes lower than a preset reference value;
wherein upon receiving the notification signal from the reception monitoring unit, the first digital broadcast reception system refers to the values representing the audio similarity-degrees in the service list stored in the service list storage unit, and judges a program which is most similar to the program of the channel currently selected by the first digital broadcast reception system as an identical program, and switches the currently selected channel to a channel judged as the identical program, wherein the most similar program is judged in part based on the subset of the values representing the audio similarity-degrees to compensate for potential temporal deviations between identical programs on the currently selected channel and another channel.

2. The digital broadcast reception device according to claim 1, wherein:
the first digital broadcast reception system includes:
a first tuner-demodulator that generates a first demodulated signal by performing channel selection and demodulation of a channel of a digital broadcast wave;
a first channel selection control unit that controls the channel selection performed by the first tuner-demodulator;
a first demultiplexer that extracts the first coded stream from the first demodulated signal generated by the first tuner-demodulator;
a decoder that decodes the first coded stream extracted by the first demodulator;
a first extraction unit that extracts the first audio spectrum information from the first coded stream extracted by the first demultiplexer; and
the first temporary storage unit that temporarily stores the first audio spectrum information extracted by the first extraction unit, and
the second digital broadcast reception system includes:
a second tuner-demodulator that generates second demodulated signals by performing channel selection and demodulation of channels of digital broadcast waves;
a second channel selection control unit that controls the channel selection so that the second tuner-demodulator successively switches the channels;
a second demultiplexer that successively extracts the second coded streams and the attached information on the broadcast program from the second demodulated signals successively generated by the second tuner-demodulator;
a second extraction unit that successively extracts the second audio spectrum information from the second coded streams successively extracted by the second demultiplexer; and
the second temporary storage unit that successively and temporarily stores the second audio spectrum information successively extracted by the second extraction unit.

3. The digital broadcast reception device according to claim 1, wherein:

the first audio spectrum information stored in the first temporary storage unit and the second audio spectrum information stored in the second temporary storage unit contain audio spectrum information regarding same frequencies, and the audio similarity-degree detection processor determines degrees of similarity from a power value represented by the first audio spectrum information and a power value represented by the second audio spectrum information in regard to the same frequencies, and determines the values representing audio similarity-degrees from the degrees of similarity in regard to a plurality of frequencies.

4. The digital broadcast reception device according to claim 1, wherein:

the first audio spectrum information stored in the first temporary storage unit includes power value information regarding a plurality of frequencies in a predetermined first frequency range, the second audio spectrum information stored in the second temporary storage unit includes power value information regarding a plurality of frequencies in a second frequency range including the first frequency range, and the audio similarity-degree detection processor repeatedly executes a process of determining the degrees of similarity between power values at a certain time point regarding a plurality of frequencies represented by the first audio spectrum information and power values at a certain time point regarding a plurality of frequencies contained in the second audio spectrum information and determines the values representing the audio similarity-degrees from all the determined degrees of similarity.

5. The digital broadcast reception device according to claim 1, wherein with regard to a value representing the audio similarity-degree calculated when a certain physical channel is selected by the second digital broadcast reception system, values representing the audio similarity-degrees in multiple times of channel selection are stored in the service list storage unit, and a sum total of the stored values representing the audio similarity-degrees in the multiple times of channel selection is stored in the service list storage unit in association with service information.

6. The digital broadcast reception device according to claim 1, wherein the audio similarity-degree detection processor calculates an absolute value of a difference between the first audio spectrum information and the second audio spectrum information regarding a same frequency, repeatedly performs the calculation for all of predetermined frequencies, and regards a sum total of calculation results obtained by the repeated calculation as the value representing the audio similarity-degree.

7. The digital broadcast reception device according to claim 1, wherein the audio similarity-degree detection processor further successively executes, for each of first audio spectrum information parts, a process in which the i-th (i is an integer of 0 or more) first audio spectrum information part out of the first audio spectrum information stored in the first temporary storage unit is extracted, a first power value obtained from addition of respective frequency components of the i-th first audio spectrum information part for all frequencies, and if the first power value is lower than a certain silence threshold value, the extracted first audio spectrum information part is judged as a first silent part;

successively executes, for each of second audio spectrum information parts, a process in which the j-th (j is an integer of 0 or more) second audio spectrum information part out of the second audio spectrum information stored in the second temporary storage unit is extracted, a second power value obtained from addition of respective frequency components of the j-th second audio spectrum information part for all frequencies, and if the second power value is lower than a certain silence threshold value, the extracted second audio spectrum information part is judged as a second silent part; and determines a value indicating the audio similarity-degree, from a first time interval between a first silent period which is a period of the first silent part and a next first silent period, a first silence duration period containing a plurality of the consecutive first silent periods, a second time interval between a second silent period which is a period of the second silent part and a next second silent period, and a second silence duration period containing a plurality of the consecutive second silent periods.

8. The digital broadcast reception device according to claim 1, wherein the audio similarity detection processor sets first audio spectrum information in which temporal storage position corresponding to a time of storage is in center out of the first audio spectrum information stored in the first temporary storage unit as evaluation target audio spectrum information and executes a process of detecting from the second temporary storage unit audio spectrum information of high audio similarity-degree with regard to the evaluation target audio spectrum information; when audio spectrum information whose audio similarity-degree is higher than a predetermined threshold value is successfully detected, if the temporal storage position of the detected audio spectrum information is earlier in time than the temporal storage position of the evaluation target audio spectrum information, the audio similarity-degree detection processor sets audio spectrum information in a storage position later in time than the temporal storage position of the evaluation target audio spectrum information as a next new evaluation target audio spectrum information to execute a process of detecting a similar sound, if the temporal storage position of the detected audio spectrum information is later in time than the temporal storage position of the evaluation target audio spectrum information, the audio similarity-degree detection processor sets audio spectrum information in a storage position earlier in time than the temporal storage position of the evaluation target audio spectrum information as a next new evaluation target audio spectrum information to execute a process of detecting a similar sound, and if audio spectrum information whose value indicating the audio similarity-degree is higher than the predetermined threshold value in any of the plurality of times of the processes of detecting the similar sound is successfully detected, the detected audio spectrum information is judged to be of a broadcast service performing an identical program and a result of judging is recorded in the service list storage unit.

9. The digital broadcast reception device according to claim 2, wherein the first extraction unit and the second extraction unit store MDCT coefficients in the coded stream in the first temporary storage unit or the second temporary storage unit, as the first audio spectrum information or the second audio spectrum information, respectively.

10. A channel selection method in a digital broadcast reception device that includes a first digital broadcast reception system that includes a first temporary storage unit, selects a channel of a digital broadcast wave, extracts first audio spectrum information from a first coded stream of the selected channel, and stores the extracted first audio spectrum information in the first temporary storage unit, wherein multiple pieces of the first audio spectrum information are extracted from different points of time in the first coded stream; and a second digital broadcast reception system that includes a second temporary storage unit, successively selects channels of digital broadcast waves, successively extracts second audio spectrum information from second coded streams of the selected channels, and successively stores the extracted second audio spectrum information in the second temporary storage unit, wherein multiple pieces of the second audio spectrum information are extracted from different points of time in each second coded stream;

the method comprising:

successively generating values representing audio similarity-degrees between a first program containing the first audio spectrum information and a second program containing the second audio spectrum information extracted from a corresponding second coded stream, from the first audio spectrum information stored in the first temporary storage unit and the second audio spectrum information successively stored in the second temporary storage unit, wherein a subset of the values representing the audio similarity-degrees represent a similarity between respective pieces of the first audio spectrum information and the second audio spectrum information that correspond to different points in time in connection with the first coded stream and the corresponding second coded stream, respectively;

generating a service list including information associating attached information extracted by the second digital broadcast reception system and the successively generated values representing the audio similarity-degree with each other and storing the service list in a service list storage unit;

sending a notification signal representing deterioration of reception status to the first digital broadcast reception system when a value representing the reception status of the digital broadcast wave of the channel currently selected by the first digital broadcast reception system becomes lower than a preset reference value; and judging, as an identical program, a program which is most similar to a program of the channel currently selected by the first digital broadcast reception system, by referring to the values representing the audio similarity-degrees in the service list stored in the service list storage unit, and switching the currently selected channel to a channel judged as the identical program, when the first digital broadcast reception system receives the notification signal, wherein the most similar program is judged in part based on the subset of the values representing the audio similarity-degrees to compensate for potential temporal deviations between identical programs on the currently selected channel and another channel.

11. The channel selection method according to claim 10, wherein:

the first audio spectrum information stored in the first temporary storage unit and the second audio spectrum information stored in the second temporary storage unit contain audio spectrum information regarding same frequencies, and in successively generating the values representing the audio similarity-degrees, degrees of similarity are determined from a power value represented by the first audio spectrum information and a power value represented by the second audio spectrum information in regard to the same frequencies, and the values representing the audio similarity-degrees are determined from the degrees of similarity in regard to a plurality of frequencies.

12. The channel selection method according to claim 10, wherein:

the first audio spectrum information stored in the first temporary storage unit includes power value information regarding a plurality of frequencies in a predetermined first frequency range, the second audio spectrum information stored in the second temporary storage unit includes power value information regarding a plurality of frequencies in a second frequency range including the first frequency range, and in successively generating the values representing the audio similarity-degrees, a process of determining the degrees of similarity between power values at a certain time point regarding a plurality of frequencies represented by the first audio spectrum information and power values at a certain time point regarding a plurality of frequencies contained in the second audio spectrum information is executed, and the value representing the audio similarity-degree is determined from all the determined degrees of similarity.

13. The channel selection method according to claim 10, wherein with regard to a value representing the audio similarity-degree calculated when a certain physical channel is selected by the second digital broadcast reception system, values representing the audio similarity-degrees in multiple times of channel selection are stored in the service list storage unit, and a sum total of the stored values representing the audio similarity-degrees in the multiple times of channel selection is stored in the service list storage unit in association with service information.

14. The channel selection method according to claim 10, wherein, in successively generating the values representing the audio similarity-degrees, an absolute value of a difference between the first audio spectrum information and the second audio spectrum information regarding a same frequency is calculated, the calculation for all of predetermined frequencies is repeatedly performed, and a sum total of calculation results obtained by the repeated calculation is regarded as the value representing the audio similarity-degree.

15. The channel selection method according to claim 10, wherein the step of successively generating the values representing the audio similarity-degrees further includes:

successively executing, for each of first audio spectrum information parts, a process in which the i-th (i is an integer of 0 or more) first audio spectrum information part out of the first audio spectrum information stored in the first temporary storage unit is extracted, a first power value obtained from addition of respective frequency components of the i-th first audio spectrum information part for all frequencies, and if the first power value is lower than a certain silence threshold value, the extracted first audio spectrum information part is judged as a first silent part;

successively executing, for each of second audio spectrum information parts, a process in which the j-th (j is an integer of 0 or more) second audio spectrum information part out of the second audio spectrum information stored in the second temporary storage unit is extracted, a second power value obtained from addition of respective frequency components of the j-th second audio spectrum information part for all frequencies, and if the second power value is lower than a certain silence threshold value, the extracted second audio spectrum information part is judged as a second silent part; and determining a value indicating the audio similarity-degree, from a first time interval between a first silent period which is a period of the first silent part and a next first silent period, a first silence duration period containing a plurality of the consecutive first silent periods, a second time interval between a second silent period which is a period of the second silent part and a next second silent period, and a second silence duration period containing a plurality of the consecutive second silent periods.

16. The channel selection method according to claim 10, wherein, in successively generating the values representing the audio similarity-degrees, first audio spectrum information in which temporal storage position corresponding to a time of storage is in center out of the first audio spectrum information stored in the first temporary storage unit is set as evaluation target audio spectrum information and a process of detecting from the second temporary storage unit audio spectrum information of high audio similarity-degree with regard to the evaluation target audio spectrum information is executed; when audio spectrum information whose audio similarity-degree is higher than a predetermined threshold value is successfully detected, if the temporal storage position of the detected audio spectrum information is earlier in time than the temporal storage position of the evaluation target audio spectrum information, audio spectrum information in a storage position later in time than the temporal storage position of the evaluation target audio spectrum information is set as a next new evaluation target audio spectrum information and then a process of detecting a similar sound is executed, if the temporal storage position of the detected audio spectrum information is later in time than the temporal storage position of the evaluation target audio spectrum information, audio spectrum information in a storage position earlier in time than the temporal storage position of the evaluation target audio spectrum information is set as a next new evaluation target audio spectrum information and then a process of detecting a similar sound is executed, and if audio spectrum information whose value indicating the audio similarity-degree is higher than the predetermined threshold value in any of the plurality of times of the processes of detecting the similar sound is successfully detected, the detected audio spectrum information is judged to be of a broadcast service performing an identical program and a result of judging is recorded in the service list storage unit.

17. The channel selection method according to claim 10, wherein a process of extracting the first audio spectrum information and a process of extracting the second audio spectrum information are processes of storing MDCT coefficients in the coded stream in the first temporary storage unit or the second temporary storage unit, as the first audio spectrum information or the second audio spectrum information, respectively.

* * * * *